March 6, 1928.  1,661,670
J. A. MILLER ET AL
CAB SIGNALING AND TRAIN CONTROL SYSTEM FOR RAILWAYS
Original Filed Feb. 24, 1920  13 Sheets-Sheet 1

Inventors
John A. Miller
and Gilbert W. Cattell
Williams, Bradbury, McCaleb & Hinkle
Attorneys March 6, 1928.

J. A. MILLER ET AL 1,661,670

CAB SIGNALING AND TRAIN CONTROL SYSTEM FOR RAILWAYS

Original Filed Feb. 24, 1920  13 Sheets-Sheet 2

Inventors
John A. Miller and Gilbert W. Cattell
Williams, Bradbury, McCaleb & Hinkle
Attorneys

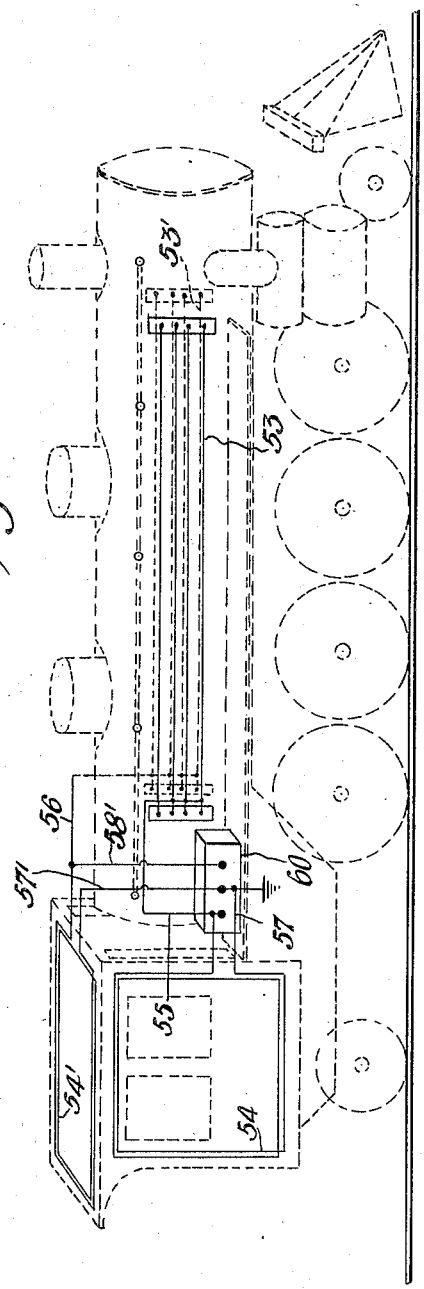

March 6, 1928.

J. A. MILLER ET AL 1,661,670

CAB SIGNALING AND TRAIN CONTROL SYSTEM FOR RAILWAYS

Original Filed Feb. 24, 1920    13 Sheets-Sheet 4

Inventors
John A. Miller
and Gilbert W. Cattell
Williams, Bradbury,
McCaleb + Hinkle
Attorneys March 6, 1928.

J. A. MILLER ET AL 1,661,670

CAB SIGNALING AND TRAIN CONTROL SYSTEM FOR RAILWAYS

Original Filed Feb. 24, 1920    13 Sheets-Sheet 7

*Fig. 8.*

Inventors
John A. Miller
Gilbert W. Cattell
Williams, Bradbury, McCaleb & Hinkle
Attorneys.

J. A. MILLER ET AL 1,661,670

CAB SIGNALING AND TRAIN CONTROL SYSTEM FOR RAILWAYS

Original Filed Feb. 24, 1920  13 Sheets-Sheet 10

Inventors
John A. Miller
and Gilbert W. Cattell
Williams, Bradbury, McCaleb & Hinkle
Attorneys

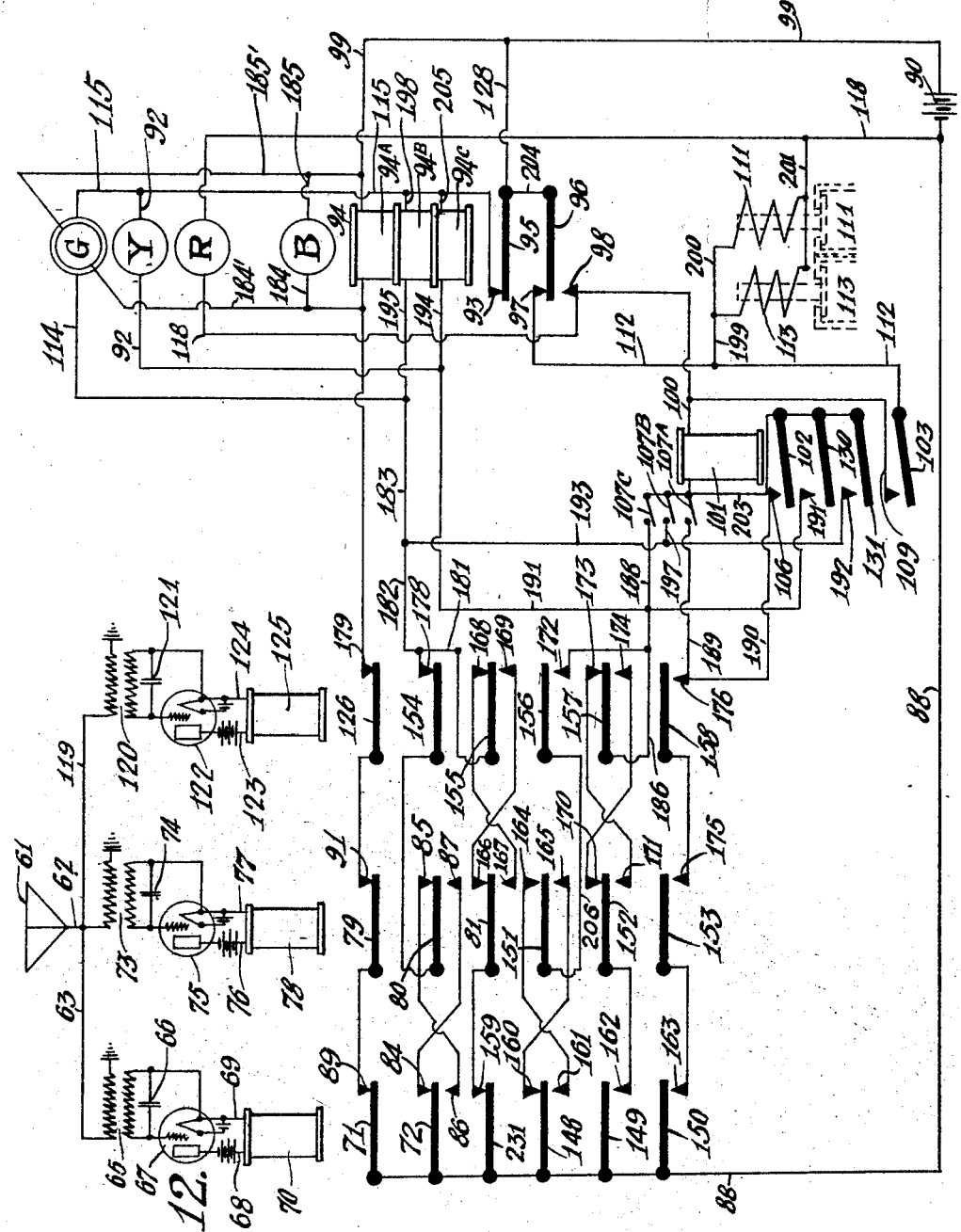

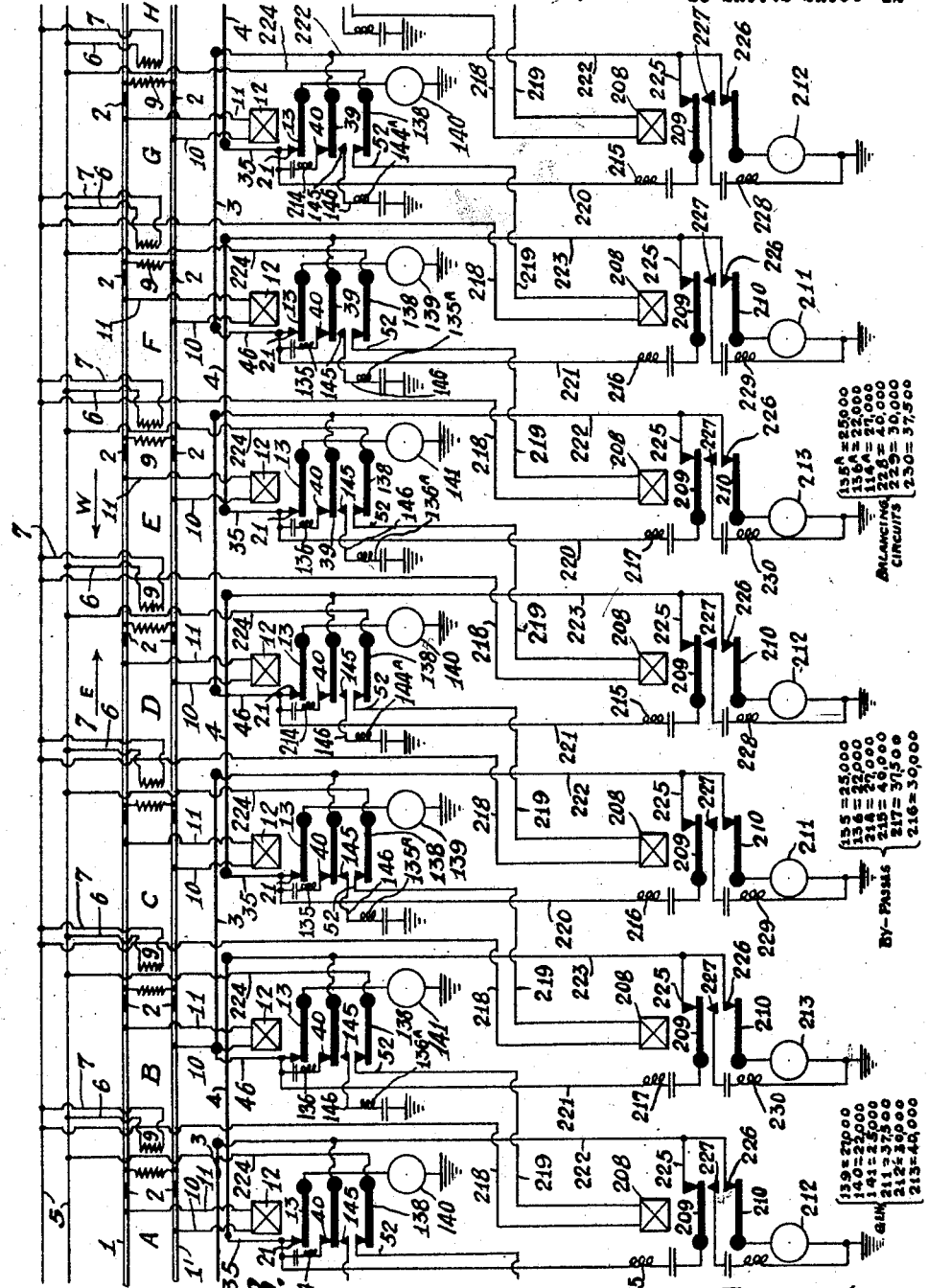

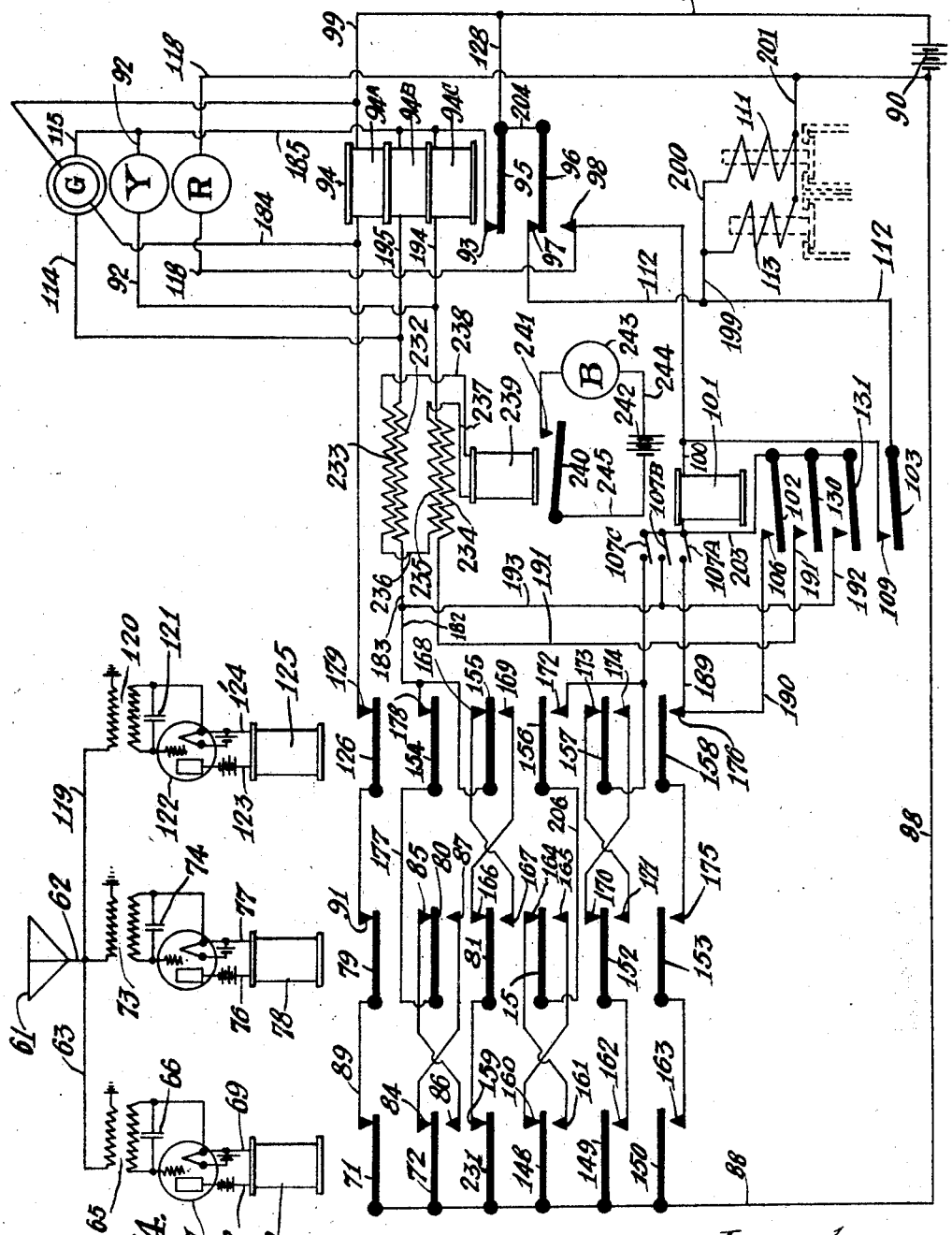

Patented Mar. 6, 1928.

1,661,670

UNITED STATES PATENT OFFICE.

JOHN A. MILLER AND GILBERT W. CATTELL, OF WAUKEGAN, ILLINOIS, ASSIGNORS, BY MESNE ASSIGNMENTS, TO UNION SWITCH & SIGNAL COMPANY, OF SWISSVALE, PENNSYLVANIA, A CORPORATION OF PENNSYLVANIA.

CAB-SIGNALING AND TRAIN-CONTROL SYSTEM FOR RAILWAYS.

Application filed February 24, 1920, Serial No. 360,751. Renewed December 21, 1927.

This invention relates to cab signaling and train control systems for railways employing electro-magnetic waves for controlling movable units as well as the giving of signals thereon.

The objects and advantages will appear and be set out as the description of the invention progresses, in connection with the accompanying drawings which form a part hereof, and the new and novel features of the invention will be particularly pointed out in the appended claims.

In the drawings,

Figure 3 is a diagram illustrating a modified arrangement of the wave wires.

Figure 4 is a diagrammatic view illustrating the method of mounting the antennæ upon a movable unit.

Figure 6:
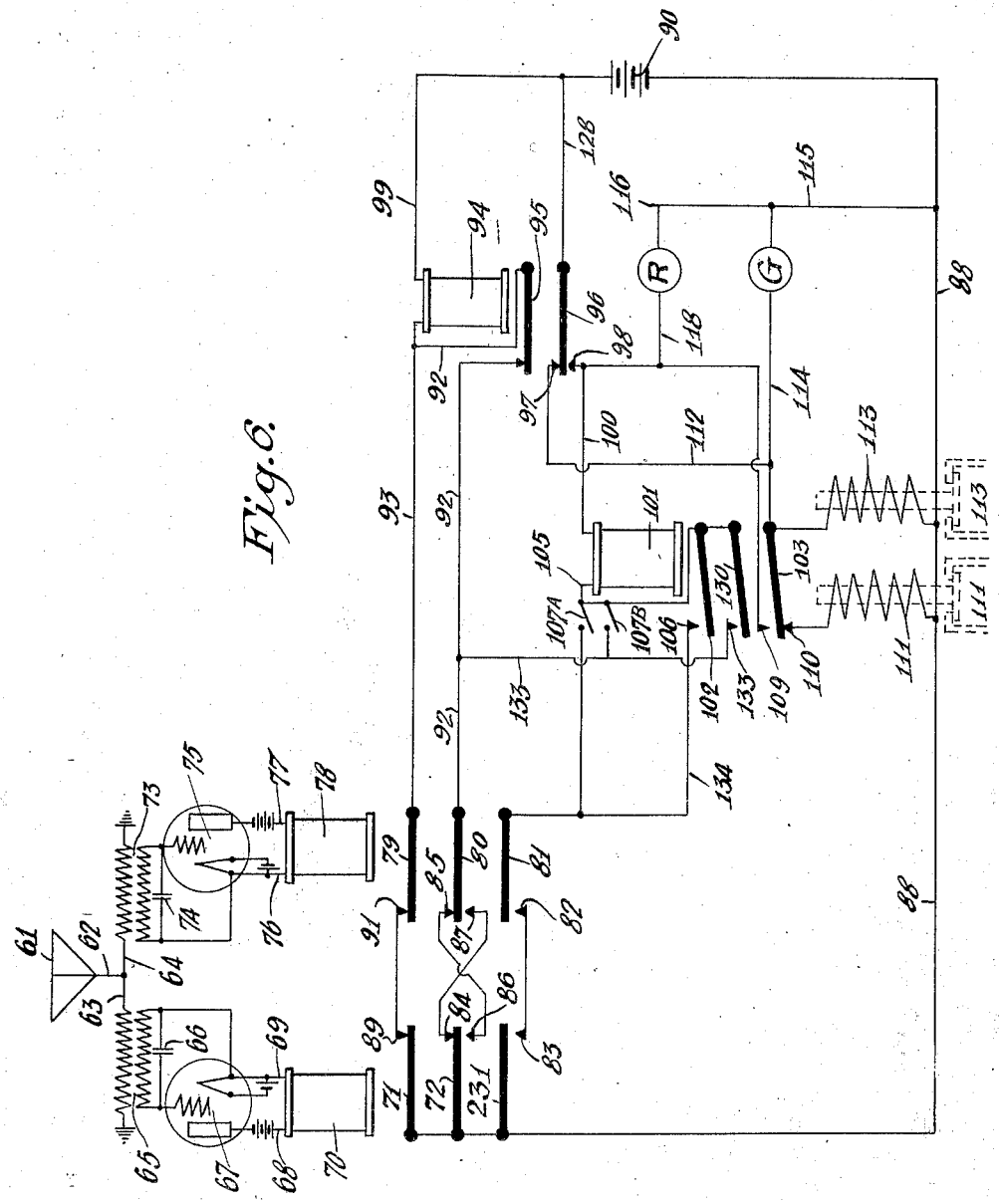

Figure 6 diagrammatically illustrates a modified form of the train system carried by the locomotive or other movable unit, provision being made in the system for an automatic application of brakes in a block adjoining an occupied block, and a second application of brakes at the entrance of the occupied block.

Figure 7:
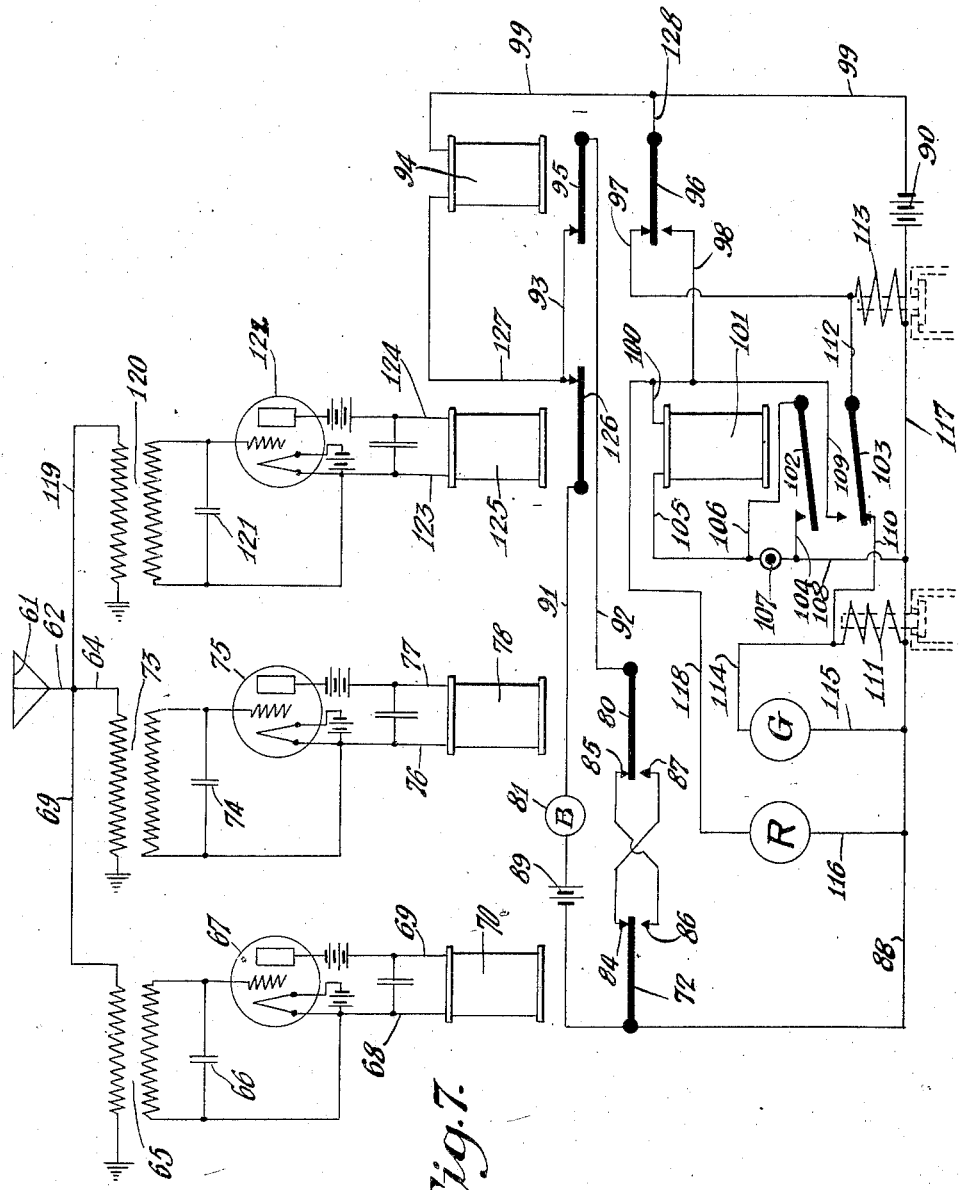

Figure 7 is a diagram of a further modification of the train system carried by the locomotive or other movable unit, the system having a device responsive to the beat frequency of the oscillations propagated by the wave wires.

Figure 8 diagrammatically illustrates the circuits and apparatus associated with one track of a double track system, the system having means controlled by conditions of safety, caution or danger for propagating radio frequent oscillations, the means comprising main and auxiliary wave wires.

Figure 9:
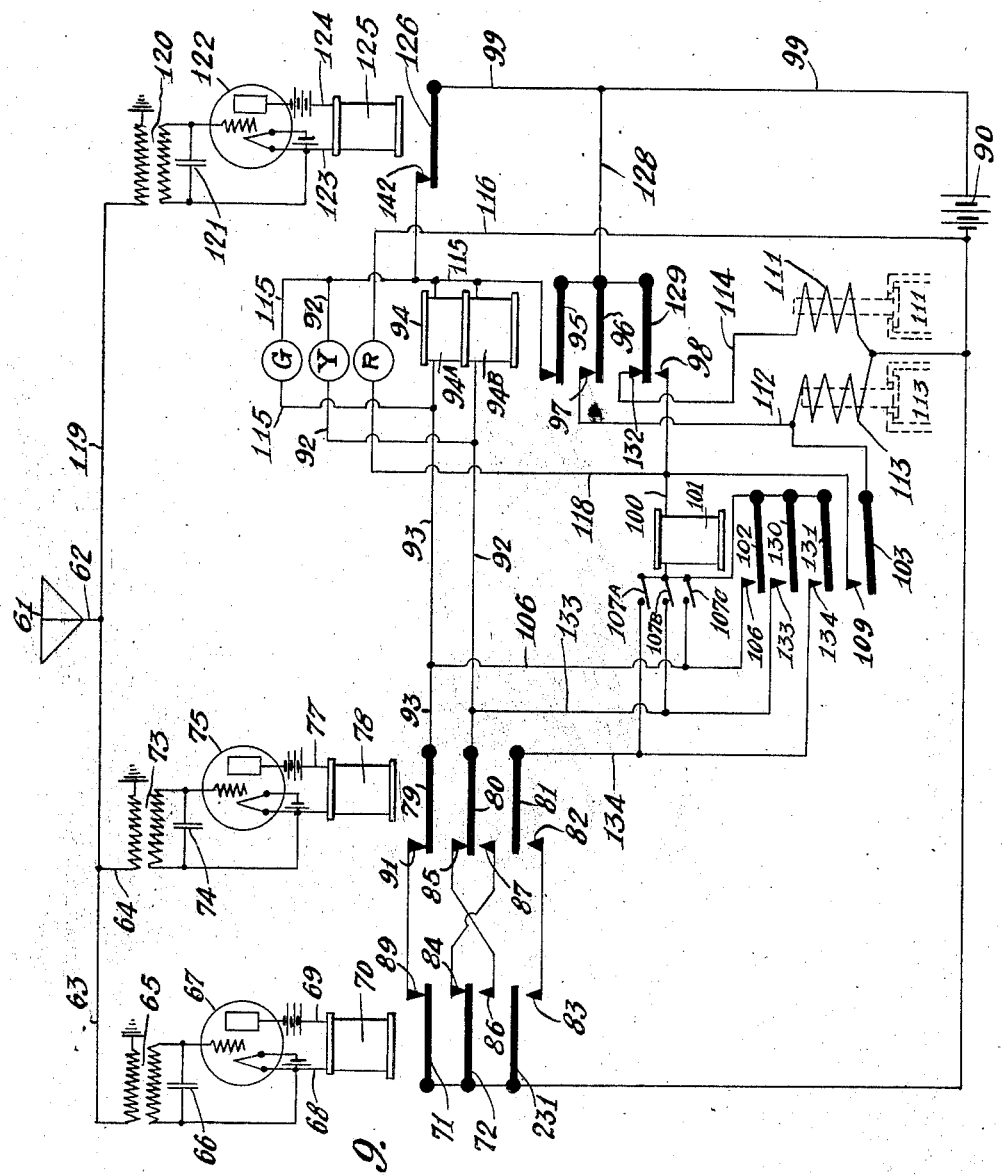
Figure 10:
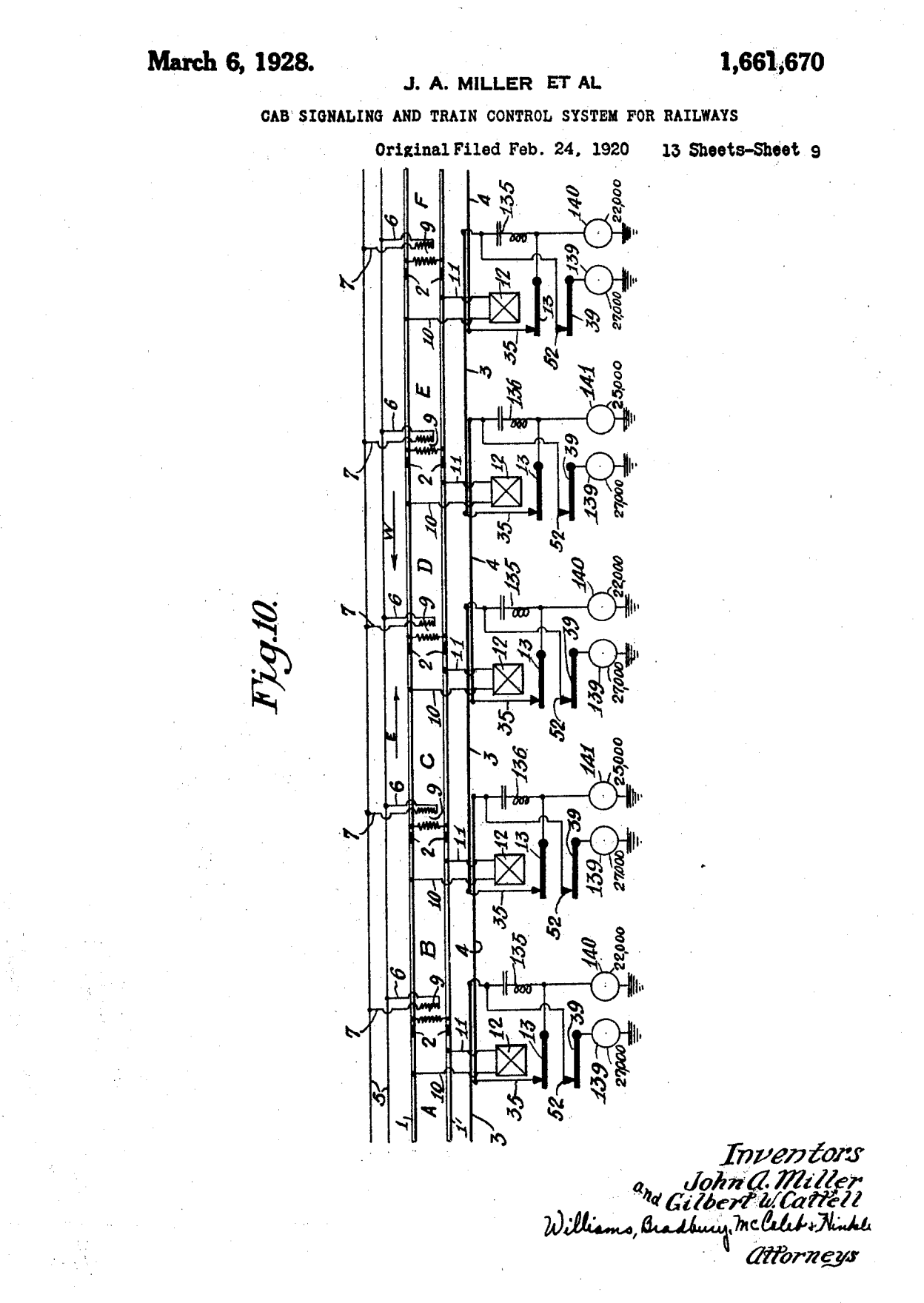

Figure 9 is a diagram illustrating a train system adapted to be carried by a movable unit, the train system comprising means adapted to cooperate with the track systems illustrated in Figures 8 and 10.

Figure 10 diagrammatically illustrates the circuits and apparatus associated with one track of a double track system, the system having wave wires for propagating radio frequent oscillations, and means dependent upon conditions of safety, caution or danger for controlling the propagation of the radio frequent oscillations.

Figure 11:
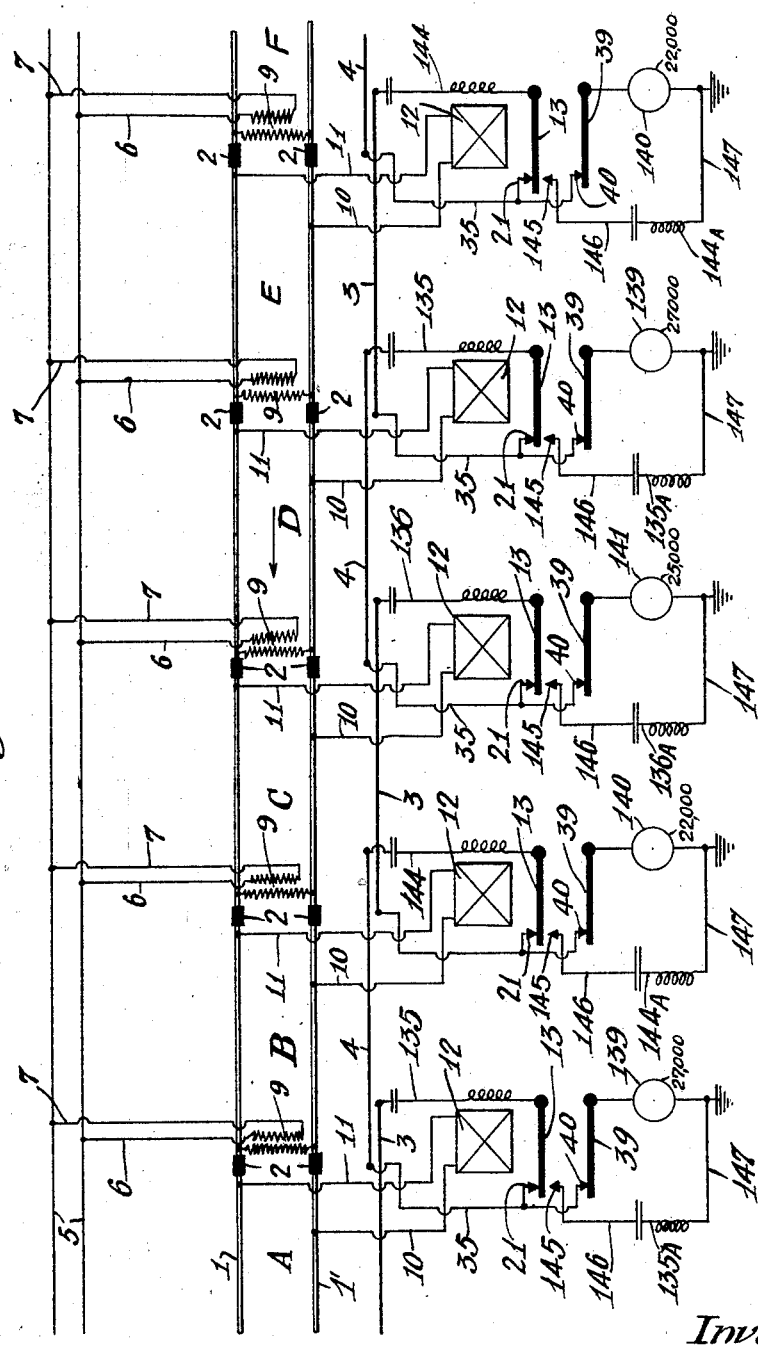

Figure 11 diagrammatically illustrates the circuits and apparatus associated with one track of a double track system, the system having by-passes between contiguous wave wires, and a balancing circuit for each wave wire.

Figure 12 is a diagram of a train circuit having means adapted to co-operate with the track system illustrated in Figure 11.

Figure 13 diagrammatically illustrates a track system for a single track railway, circuits in the track system being similar to those of the track system shown in Figure 11.

Figure 14 diagrammatically illustrates a modified form of my invention comprising a track system wherein means are provided for giving a visual indication of any change in the conditions of safety, caution or danger existing in a co-operating track system.

In the drawings like reference characters designate like parts in the several views.

Figure 1:
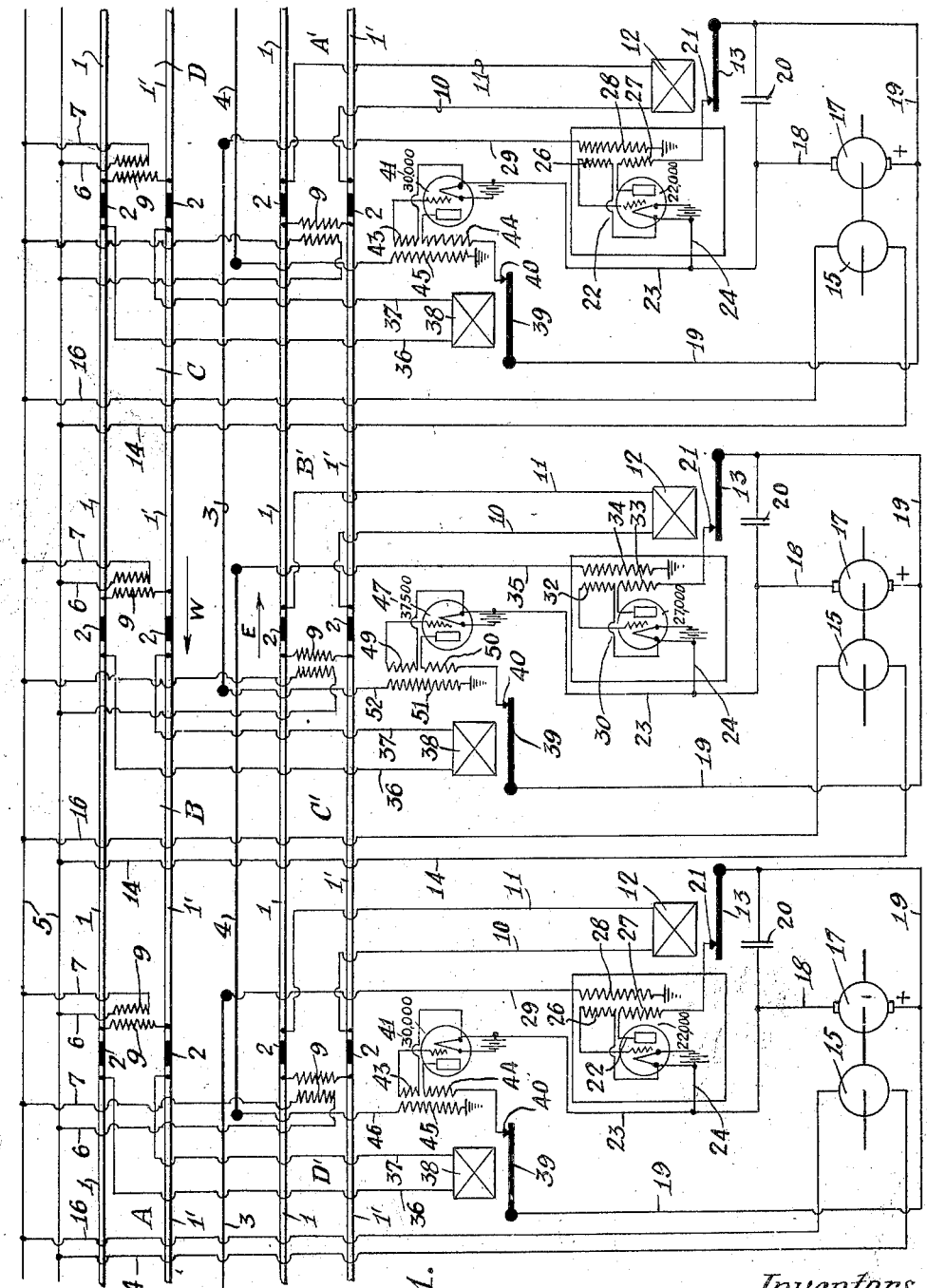
Figure 1 is a diagram of a double track system embodying the novel features of my invention.

Referring to Figure 1, we have there illustrated part of a double track system in which 1 and 1' are the running rails, which are divided into blocks by insulated rail joints 2. The blocks of the west bound track are designated A, B, C and D, and the blocks of the east bound track are designated as A', B', C', and D'. The several blocks are preferably of the same length and are so positioned longitudinally of the tracks that the insulated rail joints 2 of one track are directly opposite the insulated rail joints 2 of the other track. Thus each block of each track is paired with a block of the other track. Each block is provided with a wave wire common to both tracks in the block, the wave wires being designated alternately by the reference characters 3 and 4. Thus the wave wires 3 are associated with the blocks A and D', and, C and B', while the wave wires 4 are associated with the blocks B and C', and D and A'.

In Figure 1, 5 is an alternating current power feed circuit of suitable voltage, paralleling the railway, from which power is supplied through leads 6 and 7 to track transformers, 9, which furnish current at 8 to 12 volts for the track circuits of the various blocks in accordance with usual practice. 10 and 11 are the leads from the rails of the eastbound track circuits to the relays 12 assigned to the several blocks. Relays 12 are provided with armatures 13; 14 and 16 are the leads from the power circuit 5 to rectifiers, which may be in the form of motor-generator sets 15–17. 18 and 19 are direct current leads from the rectifier. 20 are condensers. 21 are leads from the contacts of the several armatures 13 to the plate coil windings 27 of high frequency generators 22, and to the plate coil windings 33 of high frequency generators 30 (only one being shown). 18 and 24 are direct current leads to the several frequency generators. The high frequency generators 22 and 30 are shown and described as vacuum valves of the pliotron type, but we do not wish to limit ourselves to the use of high frequency generators of this type and therefore the generators have been diagrammatically illustrated as we do not claim the specific details. The structure and operation of high frequency generators comprising vacuum valves are well known to those skilled in the art and a general description of them is sufficient for the purposes of this application. The plate coil windings 27 and 33 of the generators 22 and 30 are associated with coil windings 26 and 32 respectively. The windings 26 and 27 are inductively wound relatively to and serve as primary windings for a secondary winding 28. The windings 32 and 33 are similarly associated with secondary windings 34. Each secondary winding 28 is connected to a wave wire 3 by a lead 29 and each secondary winding 34, is connected to a wave wire 4 by a lead 35. 36 and 37 are leads from the track rails of the west bound tracks to the track relays 38. Each relay 38 is provided with an armature 39. Each armature 39 when attracted by its respective relay is adapted to engage a contact to which one end of a lead 40 is connected. The purpose of this structure will presently appear.

In addition to the high frequency generators 22 and 30, we provide a plurality of high frequency generators 41 and 47 similar in construction and operation to the aforementioned generators 22 and 30. The generators 41 and 47 have secondary windings 45 and 51 respectively and plate coil windings 44 and 50 respectively. The generators 41 and 47 also have grid coil windings 43 and 49 respectively which function as do the aforementioned windings 26 and 32. Each of the plate coil windings 44 and 50 has one terminal connected to one of the leads 40. Each secondary winding 45 is connected to a wave wire 4 by a lead 46 and each secondary winding 51 is connected to a wave wire 3 by a lead 52.

Each of the generators 22, 30, 41 and 47 is suitably adjusted in a well known manner to impress a high frequency current of definite frequency upon the wave wire to which it is assigned. For convenience we have designated upon the drawing the frequencies to which these generators might very well be adjusted in a commercial system. Thus it will be noted that generators 22 are adjusted to impress currents of a frequency of 22,000 upon wave wires 3, that generator 47 impresses a current of 37,500 frequency upon its associated wave wire 3, that generator 30 impresses a current of 27,000 frequency upon its associated wave wire 4, and that generators 41 impress currents of 30,000 frequency upon their associated wave wires 4.

Normally all of the high frequency generators 22, 47, 30 and 41 are operating and energizing their corresponding wave wires so that the latter are constantly radiating electro-magnetic waves; this because the track relays associated with the several generators are normally energized maintaining the generator circuits closed.

Now let us see how the generators assigned to the several blocks of the east bound track are controlled.

Block B'.

The track circuit of block A' is supplied with alternating current of 8 to 12 volts from track transformer 9 (not shown). The current flows along the rail 1 of the block A' the current being impressed upon the rail by its associated track transformer 9. From the designated rail 1 the current is conducted to the associated relay 12 by the lead 11. The current then flows through the winding of the relay 12 through the lead 10 and back along the rail 1' of block A' to the designated track transformer 9. This current energizes the relay 12 and its armature 13 is attracted. The attraction of the armature 13 closes a circuit whereby direct current flows from the rectifier 17 through leads 18 and 24 to the grid of a generator 22. The plate being connected at this time to the other pole of the rectifier 17, an impingement of electrons takes place upon the plate 25, and hence oscillations are set up in the secondary 28. Generator 22 being adjusted to produce a current of 22,000 frequency, this current of 22,000 frequency is transmitted from the secondary winding 28 of the transformer of generator 22 through lead 29 to wave wire 3. This wave wire extends along the whole length of block B'. Therefore, electro-magnetic waves of the frequency of 22,000 are radiated from wave wire 3 to indicate that conditions are safe in block A'.

Block C'.

Generator 30 assigned to block C' and which is adjusted to deliver a current of a frequency of 27,000 is controlled by its associated track relay 12, which is connected with the rails of block B' precisely as the track relay 12 associated with the generator 22 of block B' is connected with the rails of block A'.

Block D'.

The generator 22 assigned to block D' is controlled by its associated track relay 12. This relay is connected with the rails of block C' in exactly the same manner as the corresponding track relay associated with generator 22 of block B' is connected with the rails of block A'.

The apparatus assigned to blocks A, B, C and D of the west bound track are the same and function in the same manner as apparatus and circuits of blocks A', B', C' and D' of the eastbound track, except that high frequency generators 41 are adjusted to produce currents of 30,000 frequency for the wave wires 4 which extend along blocks B and D, and high frequency generator 47 is adjusted to produce a current of 37,500 frequency for wave wire 3, which extends along block C.

It will be noted that each of the wave wires 3 and 4 is utilized to carry two currents of different frequency, i. e., one frequency for east bound and one for west bound traffic. This is made possible because of the fact that for every block of the east bound track there is a west bound block of the same length having its terminals directly opposite those of the east bound block.

The wave wires are supported along the railway in any suitable manner as for instance by suitable poles provided for that purpose. It is important to note that the ends of each of the wave wires shown in Figure 1 overlap the ends of its contiguous wave wires. The importance of this arrangement will more fully hereinafter appear.

Figure 2:
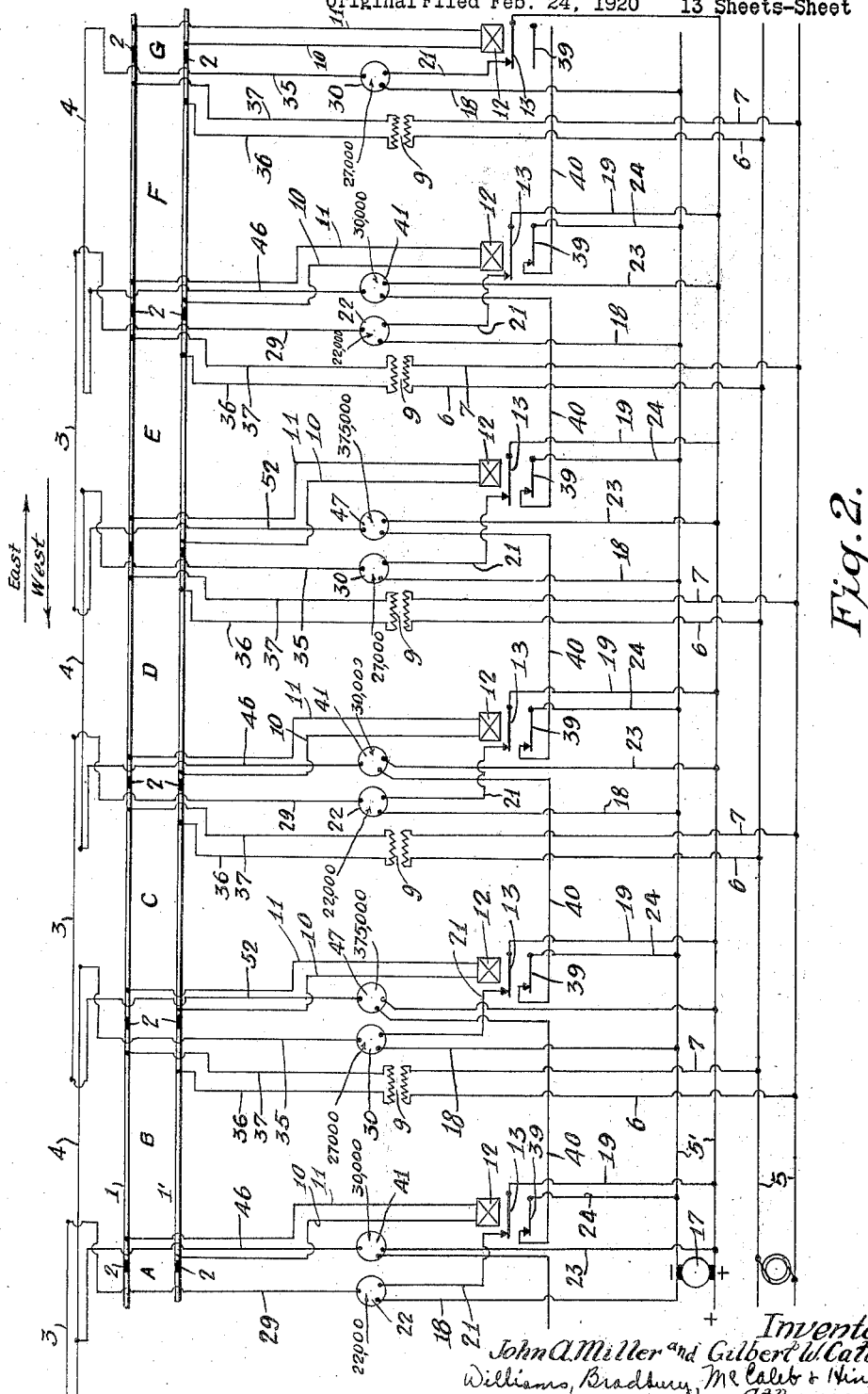
Figure 2 is a diagrammatic view of a single track system embodying the novel features of my invention.

Figure 2 illustrates a single track whereon traffic moves in both directions. 1 and 1' are the running rails which are divided into blocks by suitable insulated rail joints 2, the blocks being designated by letters A, B, C, D, E, F and G. 3 and 4 are wave wires of corresponding length alternately arranged and paralleling the several block sections. The wave wires 3 and 4 are shown for overlapping each other at block ends, thus providing for the pick-up feature of our invention, which will hereinafter be fully set forth.

In Figure 2, 5 is an alternating current power circuit of suitable voltage. 6 and 7 are leads from feeders 5 to track transformers 9, the secondaries of which are connected by leads 36 and 37 to rails 1 and 1' of the respective blocks. From 1 and 1' of each block leads 10 and 11 complete the track circuit to a relay 12, the said relays being provided with armatures 13 and 39. 17 is a direct current generator having feed wires 5', which parallel the tracks. 18, 19, 23 and 24 are leads from direct current circuit 5' to high frequency generators 22, 41, 30 and 47 and 21 and 40 are leads which together with armatures 13 and 39 complete the local circuits of said generators. The high frequency generators 22, 41, 30 and 47 are of the same three element vacuum tube type as are the generators illustrated in detail in Figure 1, and for that reason are symbolically shown for convenience. The frequency for which each generator is adjusted is indicated on the drawing. 29 and 46 are leads from high frequency generators 22 and 41 to wave wires 3 and 4. 35 and 52 are leads from high frequency generators 30 and 47 to wave wires 4 and 3 respectively. Normally all high frequency generators are operating and energizing their connected wave wires 3 and 4 with high frequency current, and the wave wires are constantly radiating electro-magnetic waves. Each high frequency generator continues to operate so long as its associated track relay is energized.

The equipment assigned to block E functions for east bound traffic as follows:

When the block F is unoccupied, current flows from its associated track transformer 9 through the lead 37, rail 1, lead 11, relay 12, lead 10, rail 1' and through the lead 36, back to the transformer 9. The relay 12 is energized by this current and closes its armatures 13 and 39. Closure of the armature 13 permits a current to flow from one of the direct current feeders 5' through lead 19, armature 13, lead 21, high frequency generator 22 and through the lead 18 to the other of the direct current feeders 5'. The generator 22 will then impress a current of 22,000 frequency upon the wave wire 3, through the lead 29. The electro-magnetic waves radiating from the wave wire 3 by reason of the impressed current will apprize all east bound traffic in block E that the block F is unoccupied.

The equipment assigned to block D normally functions for east bound traffic in the same manner, high frequency generator 30 being adjusted to produce current of 27,000 frequency which is transmitted through conductor 35 to wave wire 4 and the electro-magnetic waves radiating therefrom throughout its entire length indicate to east bound traffic in block D that block E is clear.

The several equipments assigned to blocks C, B, A, etc., alternately function for east bound traffic in all respects as do the equipments assigned to blocks E and D respectively.

The equipment assigned to block C, which includes high frequency generator 47 normally functions for west bound traffic as follows:

The relay 12 of the block B is energized by a current flowing from one terminal of the secondary winding of the track transformer 9 associated with block B, the current flowing through the lead 37, rail 1, lead 11, relay 12, lead 10, rail 1' and through the lead 36 to the other terminal of the secondary winding. The relay 12 attracts its armatures 13 and 39. The armature 39 closes a circuit which permits current to flow from one of the direct current feeders 5' through lead 24, armature 39, lead 40, generator 47 and through the lead 23 to the other of the direct current feeders 5'. Current of a frequency of 37,500 will therefore be transmitted to lead 52 and thence to wave wire 3 of block C and the electro-magnetic waves radiating therefrom throughout its entire length indicate to west bound traffic in block C that block B is clear.

The equipment assigned to block D normally functions for west bound traffic in the same manner as does the equipment assigned to block C, high frequency generator 41 being adjusted to produce current of 30,000 frequency which is transmitted through lead 46 to wave wire 4 of block D, the electromagnetic waves radiating therefrom throughout its entire length indicating to west bound traffic in block D that block C is clear.

The several equipments assigned to blocks E, F, G, etc., alternately function for west bound traffic in all respects as do the equipments assigned to blocks C and D respectively.

Figure 3 illustrates a modified arrangement of the wave wires 3 and 4. This view shows the wave wires 3 and 4 disposed end to end, being separated by a few inches instead of overlapping, as in Figures 1 and 2.

In the arrangements shown in Figures 1 and 2 the wave wires are normally alternately radiating frequencies of 22,000 and 27,000 for east bound traffic and for west bound traffic they alternately radiate frequencies of 30,000 and 37,500.

In Figures 1 and 2 the wave wires 3 and 4 are shown overlapping, and in Figure 3 they are shown as in abutting, or end to end, relation, to provide in either instance for the "pick-up" feature heretofore mentioned. We now set forth this generic feature of the invention. At the ends of the overlapping or abutting wave wires 3 and 4 there will be radiated, in the immediate zone thereof, waves of predetermined frequencies for the direction of traffic for which they are energized. Suitable responsive devices carried by a car or engine and adjusted to respond to the predetermined frequencies at the block ends for the direction of traffic which the waves are radiated to control, will close their responsive relays simultaneously, thereby providing the pick-up feature as accomplished by the auxiliary wave wire as shown and set out in the copending application of John A. Miller Serial No. 275,339, filed February 6, 1919. A modified feature of the present invention is secured by adjusting the detecting devices to respond to a resultant beat frequency in the immediate zone of the abutting or over-lapping of the wave wires.

Figure 4 illustrates a movable unit, a locomotive, equipped with antennæ suitable for picking up practically a constant amount of energy from the radiating wave wires 3 and 4 (of Figures 1, 2 and 3) throughout their entire length. This is accomplished by the combination of a flat top antenna 53 with loop antenna 54, which are carried upon the side of the boiler, and upon the side of the cab respectively. A second flat top antenna 53' and a second loop antenna 54' are placed on the opposite side of the boiler and top of cab respectively. 60 is the apparatus case placed for convenience upon the running board in front of the cab of the movable unit. 55 is the lead from antenna 53 to apparatus case 60, where it is joined by lead 57 from loop antenna 54. 56 is the common lead from antennæ 53' and 54', connected by lead 58 to responsive device 60. 57 and 57' are the leads from loop antennæ 54 and 54' to the responsive device 60, thence to ground.

The combination antennæ disclosed in Figure 4 is found very desirable in practice in that it affords a means of obtaining a uniform amount of energy radiated from the wave wires throughout their entire length. As it is known to those familiar with this art, when a circuit comprising a simple horizontal antenna, with its distributed inductance and capacity, is oscillating at its natural period, the current and electromotive force will distribute themselves along the conductor according to the law of sine and cosine. That is, the current will be a maximum at the source, diminishing to a minimum at the free end. On the other hand, the electromotive force is a minimum at the source, increasing to a maximum at the free end. The total energy present at any point along the conductor is constant, being entirely electro-magnetic at the source and entirely electro-static at the free end and made up in part of each between these two points. If oscillatory currents of different frequencies are to be received on a movable unit, and two sets of antennæ provided therefor, as is shown in Figure 4, it is desirable to have the antennæ loops separated as far as practicable or to have an effective means whereby to eliminate the interference between the two. One way to accomplish this is to place them at right angles as indicated.

Figure 5:
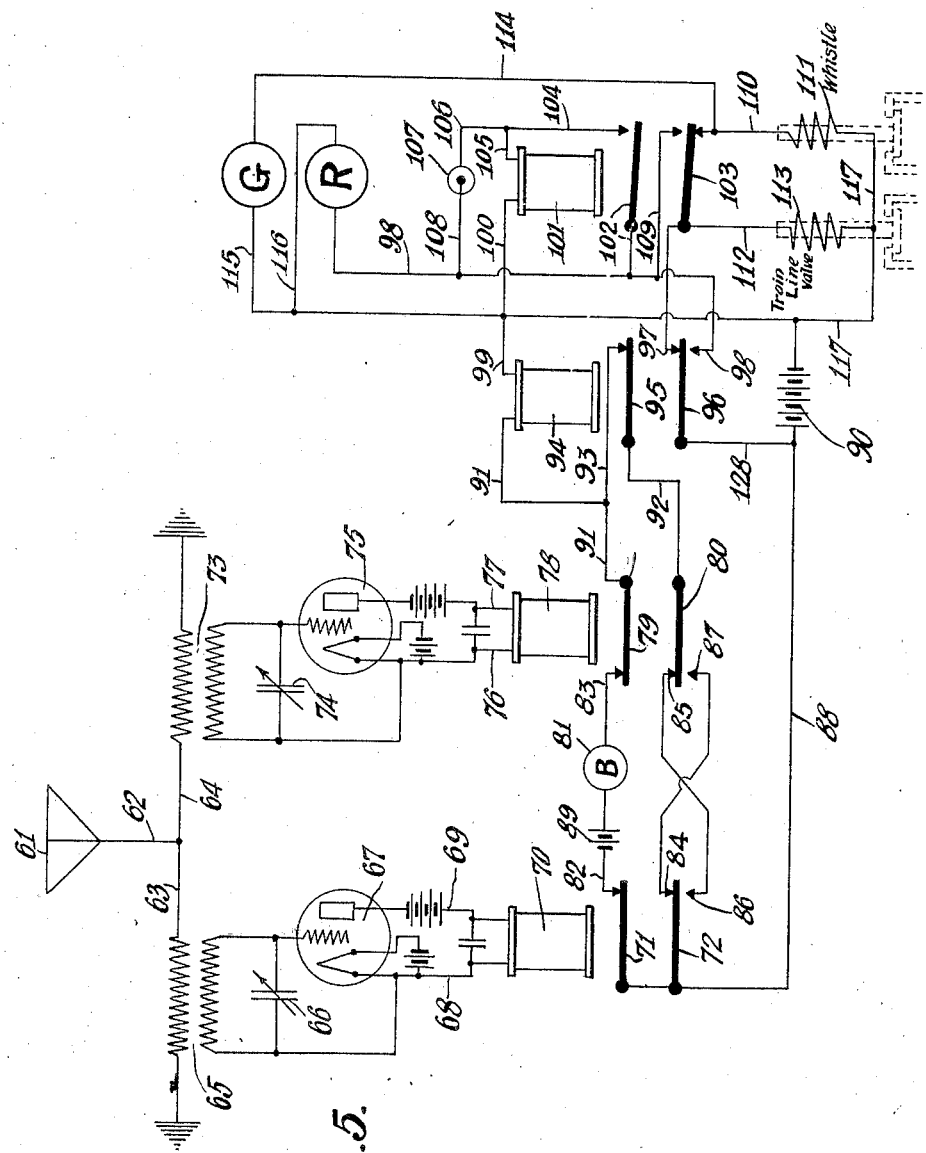
Figure 5 is a diagram of the train system carried by the locomotive or other movable unit.

Figure 5 shows diagrammatically the responsive devices of a movable unit, in which 61 is the antenna and 62, 63 and 64 are leads from the antenna 61 to transformers 65 and 73 respectively of detectors 67 and 75. 66 and 74 are the adjustable condensers of detectors 67 and 75. Leads 68 and 69 connect detector 67 with relay 70. 71 and 72 are the armatures of relay 70. Leads 76 and 77 connect detector 75 to relay 78. 79 and 80 are armatures of relay 78. 82 and 83 are the front contacts of armatures 71 and 79. Connected between contacts 82 and 83 is "end of block" indicator 81, provided with its local battery 89. 84 and 85 are the front contacts of armatures 72 and 80 respectively. 86 and 87 are the back contacts of armatures 72 and 80 respectively. 88 is the lead from pivots of armatures 71 and 72 to battery 90. 91 and 92 are leads from armatures 79 and 80 respectively to a slow acting relay 94 and armature 95. 93 is lead and front contact to armature 95. 95 and 96 are the armatures of relay 94. 97 and 98 are the front and back contacts of armature 96. 99 is a lead from relay 94 to battery conductor 115. 100 is a lead from battery conductor 115 to relay 101. 102 and 103 are armatures of relay 101. 104 is a lead from the front contact of armature 102. 105 is a lead from relay 101 to junction of leads 104 and 106. 107 is a normally open push button. 108 is lead from push button 107 to lead 98. 109 is the front contact and lead from armature 103. 110 is the back contact and lead from armature 103 to whistle valve solenoid 111. 112 is a lead from armature 103 to train line valve solenoid 113. 114 is lead from back contact 110 to green signal lamp G. 115 is lead from green signal lamp G to battery 90. 116 is a lead from red signal lamp R to conductor 115. 117 is common lead from whistle and train line valve solenoids 111 and 113, respectively, to battery 90.

The responsive devices of Figure 5 when carried on a movable unit such as a car or locomotive function as follows: Assume that detectors 67 and 75 are adjusted to respond to waves of 22,000 frequency and 27,000 frequency respectively, and that the movable unit is traveling east through the blocks of Figure 2. The relays 70 and 78 will be closed whenever the movable unit is in the immediate zone of the block ends for here the antenna 61 will pick up both frequencies from the two adjacent wave wires, and consequently armatures 71 and 72 will close against their front contacts 82 and 84 and armatures 79 and 80 will be closed against their front contacts 83 and 85 and while the movable unit is in this position at block ends, the block end indicating device B, a signal lamp, will be lighted but will cease to give block end indication when the movable unit passes out of the block end zone, it being understood that the block end signal indicator will only function when the antenna is simultaneously receiving waves of both frequencies.

With movable unit equipment of Figure 5 at a block end zone, the apparatus functions as follows: Current from battery 90 flows through the closed circuit comprising lead 88, armature 71, contact and lead 82, "end of block" indicator B, lead and contact 83, armature 79, lead 91, relay 94, leads 99 and 115, back to battery 90. Relay 94 is thus energized and holds its armatures 95 and 96 against front contacts 93 and 97, respectively. Attraction of the armatures against their said front contacts serves to close local circuits from battery 90 through lead 128, armature 96, front contact and lead 97 to armature 103. At armature 103 the circuit divides, part of current passing through lead 112, train line valve solenoid 113, and lead 117 back to battery 90. The other branch of the divided circuit is traced from armature 103 to back contact and lead 110, whistle valve solenoid 111, and leads 117 and 115 to battery 90. The branch circuit last traced divides at back contact 110 and part of the current finds its way through lead 114, safety signal light G, and lead 115 to battery 90. Thus safety is indicated by the green lamp signal and the whistle and train line valves are held closed.

As the movable unit moves out of the block end zone one frequency only will be received by antenna 61, and therefore but one of the detectors will be energized. Assuming that detector 67 (adjusted to a frequency of 22,000) is energized and detector 75 is not energized, then relay 70 will continue to hold armatures 71 and 72 attracted while relay 78 does not attract its armatures 79 and 80, armature 80 of course resting against back contact 87. This completes a circuit from battery 90 through lead 88, armature 72, front contact and lead 84, back contact and lead 87, armature 80, lead 92, armature 95, leads 93 and 91, to the relay 94, which is preferably of the slow acting type to prevent breaking of the circuit in the brief period between break and make of the armatures 72 and 80. Otherwise a make before break armature would be necessary in place of those shown at 72 and 80. From relay 94 the circuit continues through lead 99, and lead 115 back to battery 90. Armature 96 being held against front contact 97 completes the local circuits through its three parallel branches, thus maintaining the train line valve and whistle valve closed and safety light G energized.

Assume that the movable unit has now passed into the next successive block. In so passing the alternate frequency of 27,000 will be picked up by the antenna 61 and therefore detector 75 (adjusted to a frequency of 27,000) will respond and energize relay 78, which will hold its armatures 79 and 80 against their front contacts 83 and 85 and relay 70 will be de-energized and its armatures 71 and 72 will be released, armature 72 dropping against its back contact 86. The local circuit will thus be closed through relay 94 as follows: from battery 90 to lead 88, armature 72, contact and lead 86, contact and lead 85, armature 80, lead 92, armature 95, contact and lead 93, lead 91, relay 94, and leads 99 and 115 to battery 90. Armature 96, being retained against its front contact 97, completes the local circuit through its three parallel branches and thus maintaining the train line valve with whistle valve closed and safety light G energized. The armature 96 is retained against its front contact, wherefore the three parallel branches of the circuit comprising the lead 97, the safety light G, and the solenoids 111 and 113 will maintain the train line valve and whistle valve in a closed condition, and the safety light G energized.

Assume that the radiation of electro-magnetic waves from both wave wires 3 and 4 ceases for any reason. Detectors 67 and 75 will cease to energize relays 70 and 78 and their armatures 71, 72, 79 and 80 will drop away from the front contacts, 82, 84, 83 and 85 respectively. The armatures 72 and 80 will engage their respective back contacts 86 and 87. It is readily understood that the circuits comprising the safety lamp G and the solenoids 111 and 113 will be opened by the above described displacement of the several armatures 71, 72, 78 and 80. The safety lamp G will then cease to glow and the solenoids 111 and 113 will no longer retain their respective valves in a closed condition, the valves opening to permit the whistle to give an audible signal and the brakes to frictionally engage the wheels of the movable unit. A red light signal will be given, by the closing of a circuit traceable as follows: from battery 90, lead 128, armature 96, back contact and lead 98, red lamp R, and thence through leads 116—115 back to battery 90, as relay 94 has become de-energized owing to the dropping off of the armatures 71, 72, 79 and 80.

The push button 107 can be used to energize train line valve solenoid 113 and thus hold the train line valve closed. The circuit closed by pressing button 107 is traced as follows: from battery 90 through lead 128, armature 96, back contact and lead 98, lead 108, push button 107, leads 106 and 105, relay 101, (closing its armatures 102 and 103) leads 100 and 115, back to battery 90. Armature 102 now lying against front contact 104, a circuit is closed from lead 105 through relay 101, leads 100 and 115, battery 90, lead 128, armature 96, back contact and lead 98, and armature 102. Thus relay 101 is kept energized after the push button has been depressed and released. Armature 103 being held closed by relay 101 closes the circuit of train line valve solenoid 113, and thus closes the train line valve, the circuit being traced as follows: from battery 90 through lead 117, solenoid winding 113, lead 112, armature 103, front contact and lead 109, back contact and lead 98, armature 96 and lead 128 back to battery 90.

Assuming the radiations from wave wire 3 to be absent due to any cause, and a responsive device such as shown in Figure 5 to be in the zone of wave wire 4, the detector responsive to radiations of wave wire 4 will, as it passes from its influence have its detector cease to energize its relay and thus both relays 70 and 78 would become de-energized, the green safety lamp will be extinguished, the red "danger" lamp will be energized and the train line and whistle valves will be de-energized, as and for the reasons heretofore explained.

It will be understood that whenever the car or locomotive carrying the equipment shown in Figure 5 is in a block, the wave wire assigned to which is emanating waves of the frequency to which one of the detectors 67 and 75 is adjusted, the green lamp forming a part of the car or locomotive equipment will be energized, indicating that the block in advance of that occupied by the car or locomotive is unoccupied. When the propagation of waves by said wave wire ceases, the red danger lamp is energized and the whistle is caused to blow and the brakes are set to give the driver of the car or locomotive unmistakable notice that the block in advance is occupied. As the car or locomotive provided with the equipment of Figure 5 passes through a series of unoccupied blocks, the safety indication is maintained at all times, first by the energization of one of the detectors and then by the energization of the other. As the car or locomotive passes from one block into another, both detectors are simultaneously energized for a brief interval of time, with the result that the "end of block" indicator B gives the driver notice that he is passing from one block into another. The purpose of the push button 107 is to enable the driver to proceed with caution notwithstanding an indication that the block ahead is not safe. He can, however, thus proceed under caution only with the danger lamp illuminated and the whistle blowing.

Figure 6 is a diagrammatic representation of a modified arrangement of the responsive devices of a movable unit, this modified arrangement affording an automatic application of brakes in a block adjoining an occupied block, and a second application of brakes at the entrance of the occupied block. Antenna 61 and detectors 67 and 75, relays 70 and 78 are arranged and function the same as in Figure 5. In Figure 6 the relays 70 and 78 have additional armatures 231 and 81 respectively. The armatures 231 and 81 have back contacts 83 and 82 respectively, the contacts being connected by a lead as shown. The armature 231 is connected to the lead 88 and the armature 81 is connected to a switch 107<sup>A</sup> and to a contact 106 by a lead 134. The relay 101 is provided with an additional armature 130 adapted to engage a contact 133 when the relay 101 is energized. The contact 133 is connected to a switch 107<sup>B</sup> and the lead 92. The remaining leads and apparatus in the diagram, when indicated by the same reference characters as are employed in Figure 5 have functions similar to the respective elements of Figure 5.

In our consideration of Figure 6 it will only be necessary for us to describe the functions and advantages of the additional apparatus which distinguish the equipment of Figure 6 from that shown in Figure 5. Let us assume that a locomotive provided with the responsive equipment of Figure 6 is in one of the blocks of the railway shown in Figure 2, and that the responsive apparatus has functioned to cause an application of the brakes in a block in advance of an occupied block. Now let us assume that the driver has closed manual switch 107<sup>A</sup> for the purpose of holding the train line valve closed, and is proceeding under caution through the block in advance of the occupied block, with relays 70 and 78 de-energized.

The means whereby the switch 107<sup>A</sup> is adapted to hold the train line valve closed, comprises the armatures 81 and 231. Whenever both of the detectors 70 and 78 fail to receive radio frequent oscillations of proper frequencies, the armatures 81 and 231 will rest against their respective back contacts 82 and 83. Closure of the switch 107<sup>A</sup> will permit a current to flow from the battery 90 through lead 128, armature 96, contact 98 lead 100, solenoid 101, lead 105, switch 107<sup>A</sup>, armature 81, contacts 82 and 83, armature 231 and through the lead 88 back to the battery 90. The resulting energization of the relay 101 will cause the armatures 103, 130 and 102 to engage their front contacts 109, 133 and 106 respectively. Engagement of the armature 102 with the contact 106 will close a holding circuit adapted to keep the relay 101 energized, after the switch 107<sup>A</sup> has been released or opened. This circuit permits current to flow from the battery 90 through lead 128, armature 96, contact 98, lead 100, relay 101, lead 105, armature 102, contact 106 lead 134, armature 81, contacts 82 and 83, armature 231 and through the lead 88 back to the battery 90. Solenoid 113 will be energized thus closing the train line valve so that the train can proceed under caution. The current energizing the solenoid 113 at this time will flow from the battery 90 through the lead 128, contact 98, contact 109, armature 103 solenoid 113 and through the lead 88, back to the battery 90. Closure of the switch 107<sup>A</sup> will also close the circuit through G, viz, 90, 128, 96, 98, 109, 103, 114, G, 115, 90, and the appearance of both R and G will indicate to the engineer that the apparatus is functioning correctly and that it is safe to proceed under caution.

With the train circuit so conditioned by the momentary closure of the switch 107<sup>A</sup> the train will approach the occupied block.

At the entrance of the occupied block relay 70 or 78 will be energized by the electromagnetic waves existent in that block. Let us assume that it is relay 70 that becomes energized due to the fact that its associated detector 67 is detecting electro-magnetic waves, propagated by the wave wire of the occupied block. The relay 70 will attract its armatures 71, 72, and 231. The armature 231 when disengaged from the contact 83 will open the holding circuit for the relay 101, the holding circuit as above described comprising the battery 90, lead 128, armature 96, contact 98, lead 100, relay 101, lead 105 armature 102, contact 106, lead 134, armature 81, contacts 82 and 83, armature 231 and lead 88. The armatures 102, 130 and 103 of the relay 101, will be released, thus opening the circuit comprising the battery 90, armature 96, contact 98 contact 109, armature 103, solenoid 113, and the lead 88. The solenoid 113 will be de-energized and the train line valve permitted to open. It is apparent that the brakes of the movable unit will be applied then for the second time.

In the foregoing description of the circuits illustrated in Figure 6, it was pointed out that as long as either of the detectors 67 and 75 were receiving electro-magnetic waves of certain frequencies, the solenoids 111 and 113 would remain energized. However, this was subject to the assumption that at first, both of the detectors had been receiving electro-magnetic waves simultaneously, the waves being of proper frequencies, and that the relay 94 had been energized. The conditions resulting in a second application of the brakes arise only after there has been a total absence at any one time of radio frequent oscillations capable of affecting the detectors. The absence of proper radio frequent oscillations will result in de-energization of the relay 94, as the armature 71, 72, 79 and 80 will be released, and will open the circuits comprising leads 92 and 93, through which current must flow if the relay 94 is to remain energized. It is well to point out that until there is a restoration of normal conditions by a simultaneous delivery of radio frequent oscillations of correct frequencies to the detectors, resulting in the energization of the relay 94, the train system will function in a different manner from that in which it functioned before a condition of danger arose.

After the second application of the brakes, the train may again proceed, as the brakes may be released by the closure of the switch 107$^B$. When the switch 107$^B$ is so operated, it will close a circuit consisting of the battery 90, lead 128, armature 96, lead 100, relay 101, lead 105, switch 107$^B$, lead 133, lead 92, armature 80, contacts 87 and 84, armature 72 and the lead 88. The current flowing in this circuit will energize relay 101 which will in turn attract the armatures 102, 130 and 103 bringing the armature 130 into engagement with the contact 133. The relay will now remain energized as a current will flow from the battery 90 through lead 128, armature 96, contact 98, lead 100, relay 101, lead 105, armature 130, contact and lead 133, lead 92, armature 80 contacts 87 and 84, armature 72 and through the lead 88 back to the battery 90. The energization of the relay 101 will cause the brakes to be released in a manner which has been described. The train may then proceed with caution into the occupied block.

Figure 7 shows diagrammatically a responsive device for a movable unit, which responsive device makes use of the beat frequency pick up feature of the present invention. In this figure 61 is the antenna, 62, 63, 64 and 119 are leads from antenna 61 to transformers 65, 73 and 120 respectively of detectors 67, 75 and 122. 66, 74 and 121 are adjustable condensers of detectors 67, 75 and 122. Leads 68 and 69 connect detector 67 with relay 70. 72 is the armature of relay 70. Leads 76 and 77 connect detector 75 to relay 78. 80 is the armature of relay 78. Leads 123 and 124 connect detector 122 with relay 125. 126 is the armature of relay 125. Lead 91 connects pivots of armatures 72 and 126. 89 is a battery in the lead 91 for energizing block end detector 81. 84 is the front contact of armature 72 with lead to back contact 87 of armature 80. 85 is the front contact of armature 80 with lead to back contact 86 of armature 72. 88 is a lead from pivot of armature 72 to lead 117, connected with battery 90. 92 is lead from pivot of armature 80 to pivot of armature 95 of relay 94. 93 is lead from front contact of armature 95 to front contact and lead 127 of armature 126 of relay 125. 127 is front contact and lead from armature 126 of relay 94. 99 is lead from winding of relay 94 to common battery 90. 95 and 96 are armatures of relay 94. 97 is front contact and lead from armature 96 to train line valve 113. Relay 101 and signal lamps R and G and solenoids 111 and 113 are connected the same as shown in Figure 5.

The responsive devices of Figure 7 function in all respects as do the devices of Figure 5, with the exception that the "pick-up" at the block ends is here accomplished by detector 122 and its connected relay 125, detector 122 being adjusted to respond to the beat frequency resulting from the simultaneous radiation of electro-magnetic waves from wave wires 3 and 4 at the block ends. It is obvious that detector 122 cannot function if the radiations from either wave wire is absent. The functioning of the balance of the responsive devices, namely relays 94 and 101 and their connections is identical with the functioning of same as described in connection with Figure 5.

In the double track system of Figure 1, all blocks both east bound and west bound are indicated as being clear and all wave wires therefore radiating their electro-magnetic waves. Assume a movable unit to be in block B of the west bound track. The wheels and axles of the movable unit will short circuit the track transformer 9 of block B thus de-energizing relay 38 of block B. Since armature 39 has dropped high frequency generator 47 will cease to supply a current of 37,500 frequency to wave wire 3. Thus radiations of electro-magnetic waves of the frequency of 37,500 are absent throughout block C.

Assume another movable unit, west bound, to be in block D. Block C being unoccupied its track relay 38 is receiving current from track transformer 9, holding armature 39 closed against front contact 40. High frequency generator 41 is therefore supplying current of 30,000 frequency from secondary 45 through leads 46 to wave wire 4, and will radiate electro-magnetic waves of 30,000 frequency throughout block D. The movable unit in block D being equipped with antennae preferably of the form shown in Figure 4, and with responsive indicating and controlling devices as shown in Figures 5, 6 or 7, will receive said radiations by means of its detector tuned to this frequency of 30,000. Its other detector tuned to a frequency of 37,500 will not be energized. Consequently the responsive relays and indicating and controlling devices of said movable unit will respond to this clear indication as described in detail in connection with the description of the functioning of the devices of Figure 5. Now when the movable unit passes from block D into block C both of its detectors will become de-energized and as wave wire 3 is not radiating electro-magnetic waves to which its responsive devices are tuned relay 94 (of Figures 5, 6 or 7) will be deenergized, thus cutting off current from battery 90 to whistle and train line solenoids 111 and 113 and safety light G. Simultaneously the circuit of the danger lamp R, will be closed, giving visual danger indication, and the whistle will be caused to sound and the brakes to be applied by the de-energizing of the solenoids 111 and 113. In order that the movable unit may proceed through block C, push button 107 (Figure 5) is provided which may now be closed temporarily, thus energizing relay 101, which will then remain closed, functioning to energize train line solenoid 113 and permitting the movable unit to proceed despite the danger indication as described in detail in connection with the description of Figure 5. The danger indication will continue to be given on the second movable unit until a block end is reached, where the block next in advance to the one about to be entered is clear. If in the meantime the movable unit in block B has proceeded into and through and cleared block A, the second movable unit on reaching the end of block C will receive simultaneously the two west bound frequencies of 30,000 and 37,500 from wave wires 4 and 3 respectively, and the resultant beat frequency serving to restore the movable unit apparatus to normal, that is, clear or running condition with valves 111 and 113 closed and green signal G displayed. The restoration circuit is traced as follows: energization of detector 122 causes energization of relay 125, the armature of which then contacts lead 127 and energizes relay 94, causing its armatures 95 and 96 to contact 93 and 97 respectively. The breaking of the circuit at 98 de-energizes relay 101 and its armature 102 breaks contact at 104 and its other armature 103 contacts lead 110. The light G, valve 111, relay 101 and valve 113 are thereby connected in parallel with the battery 90.

Eastbound movable units equipped with apparatus adjusted to respond to high frequency currents of 22,000 and 27,000 frequencies as produced by high frequency generators 22 and 30 respectively would receive indications and function in exactly the same manner in passing over east bound track through blocks D′, C′, B′, and A′.

In a single track system, Figure 2, all blocks are shown as being clear and all wave wires are therefore radiating electro-magnetic waves indicating the same.

Assume a movable unit to be in block D west bound, track current from transformer 9 of block D will be short circuited by wheels and axles of said movable unit and relay 12 of block D will be de-energized dropping its armatures 13 and 39, thus causing high frequency generator 22 to cease furnishing high frequency currents of 22,000 frequency and high frequency generator 47 will cease furnishing high frequency currents of 37,500 frequency, resulting in cutting off the former frequency from wave wire 3 extending through block C in advance of movable unit occupying block D and also cutting off the latter frequency from wave wire 3 extending through block E to the rear of west bound movable unit. The movable unit in block B is protected from eastbound traffic throughout the entire block in advance and is also protected from the following westbound traffic for a full block in rear. Opposing and following movable units equipped for the direction of traffic in which they are moving will function to protect themselves as well as opposing and following movable units in a similar manner, details of operation having been given in connection with the description of movable unit apparatus in describing Figure 1.

Figures 8, 9, 10, 11, 12 and 13 collectively are diagrammatic drawings showing the invention used to give signal indications on the movable unit of safety, caution or danger, together with two stop features, one stop when approaching and another when entering a block that is occupied or in which the apparatus and circuits for producing the radio frequent oscillations in the preceding block have become conditioned in the same manner as if the block were occupied. In this connection Figs. 8 and 10 show one track of a double track railway in which the rails are indicated as 1 and 1′, the insulated rail joints as 2, and are used to divide the track into blocks which are indicated as A, B, C, D, E, F. Blocks A and F are part blocks while B, C, D, E, are full blocks. 3 and 4 are wave wires paralleling the blocks, overlapping each other at the ends. 5 are alternating current power feed lines for furnishing current for track circuits with leads 6 and 7 to track transformer 9. 10 and 11 are leads from rails 1 and 1′ to track relays 12. Relay 12 in Figure 8 has armatures 13, 39 and 138. 139, 140 and 141 are high frequency generators of the usual type adjusted to produce as follows: 139, frequency of 27,000; 140 a frequency of 22,000 and 141 a frequency of 25,000. High frequency generator 140 has lead to armature 39, front contact 40, to lead 35, to wave wire 4 extending throughout the length of a block section and at the end of a block section wave wire 4 has a lead through bypass 136, adjusted to pass high frequency currents of 22,000, thence to armature 13 to front contact 21, lead 46 to wave wire 3, and thence along wave wire 3 to end of block C. High frequency generator 139 adjusted to produce 27,000 frequency currents has lead to armature 138, front contact and lead 52 to auxiliary wave wire 137 which parallels the overlapping wave wires 3 and 4 for a short distance into the preceding block.

Figure 9 is a drawing of the movable unit apparatus and circuits for utilizing the caution, danger and safety indications and securing the two stop feature heretofore referred to. The antennæ 61 and connections and detectors 67, 75 and 122, relays 70, 78 and 125 are connected and designated the same as shown in drawing Figure 7. 71, 72 and 231 are armatures of relay 70; 79, 80 and 81 are armatures of relay 78. 126 is armature of relay 125. 94$^A$ and 94$^B$ are windings of master relay 94 having armatures 95, 96 and 129. 101 is a hold relay having armatures 102, 130, 131, 103. 111 is solenoid of audible whistle and 113 is solenoid of air brake valve. The circuits and leads will be described in connection with the operation of Figures 8 and 9.

Normally all high frequency generators in Figure 8 are operative, producing high frequency currents traversing their respective wave wires and radiating from wave wires 3, 4 and 137 their respective electromagnetic waves. Assume a movable unit to be in block B and another movable unit equipped as shown in Figure 9 to be in block F with its detector 67 adjusted to respond to 22,000 frequency, detector 75 to respond to 25,000 frequency and detector 122 to respond to 27,000 frequency. As the movable unit thus equipped comes to the end of block F with all detectors deenergized and comes within the range or zone of the overlapping waves wires 3, 4 and 137, its detectors will receive frequencies 22,000, 25,000 and 27,000 simultaneously energizing relays 70, 78 and 125 and closing their respective armatures and contacts. The master relay 94 is energized as follows: starting from battery 90 to lead 88 armature 71 contact and leads 89 and 91, armature 79, lead 93, winding 94$^A$, lead 115, contact and lead 142, armature 126, lead 99 back to battery 90, thus closing armatures and contacts 95, 96 and 129. The green signal lamp G is in parallel with the winding 94$^A$ and will burn the moment the above described circuit through the winding 94$^A$ is closed. The current operating the lamp G will flow from battery 90 through the lead 88, armature 71, contacts 89 and 91, armature 79, lead 93, lead 115, in which the lamp G is operatively connected, contact 142, armature 126, and through the lead 99, back to the battery 90. In concert with the operation of the lamp G the solenoids 111 and 113 are energized by the aforementioned closing of the armatures 96 and 129. The current for energizing the solenoid 113 flows from the battery 90 through the lead 88, solenoid 113 contact 97, armature 96, lead 128 and through the lead 99 back to the battery 90. The current for the solenoid 111 will flow from the battery 90, through the lead 88, solenoid 111, lead 114, contact 132, armature 129, lead 128 and return to the lead 99 to the battery 90. When the solenoids 11 and 113 are so energized, the whistle and train line valves will be closed. As movable unit Figure 9 proceeds into block E and then passes out of the zone of auxiliary wave wire 137, relay 125 will be deenergized and will drop armature 126, but master relay 94 will continue to hold closed through its lead 115 and its contact armature 95, leads 128 and 99 to battery 90. As the movable unit passes into block D from block E the green signal light will be extinguished and the yellow signal light will be given by reason of the movable unit in block B having short circuited track relay 12 of block B, opening circuit of armature 39 cutting off 25,000 frequency current from high frequency generator 141 wherefore movable unit will only receive 22,000 frequency current and relay 78 will be deenergized dropping its armature 79, 80 and 81. Master relay coil 94$^A$ is deenergized but coil 94$^B$ is energized through its circuit as follows: from battery 90, lead 88, armature 72, upper contact 84 with lead to lower contact 87, armature 80 to lead 92. Yellow light is in parallel with winding 94$^B$. The movable unit Figure 9 passes through block D under caution, with yellow signal light burning, and enters block C, whereupon the yellow light will be extinguished and valves and solenoids 111 and 113 will be deenergized and red signal light R will be displayed by reason of movable unit in block B, as stated before, having opened relay 12 of block B cutting off waves of 22,000 and 25,000 frequencies, armatures 13 and 39 being open. Therefore relay 70 is deenergized dropping armatures 71, 72 and 231. This results in the de-energization of both coils of the relay 94 as the above described circuits for these coils are opened. Likewise the solenoids 111 and 113 are deenergized as the armatures 96 and 129 leave the contacts 107 and 132 respectively. The whistle will then sound and the brakes will be applied. The red light is displayed by its circuit from battery 90, leads 99 and 128, armature 129, contact 98 and leads 118 and 116 to battery 90. The movable unit can proceed by utilizing push button 107$^A$ closing relay 101 through its circuit as follows: battery 90, lead 88, armature 231, lower contact 83, lead 88, lower contact 82, armature 81, lead 134, to push button 107$^A$ through coils 101, lead 100, lower contact 98, armature 129, leads 128 and 99 to battery 90, closing armatures 102, 130, 131 and 103. Air brake valve 113 is closed as follows: from battery 90, leads 99 and 128, armature 129, lower contact and lead 98, lead 109, contact armature 103, lead 112 through solenoid 113 to battery 90. Relay 101 is held closed as follows: battery 90, lead 88, armature 231, contact 83, lead 88, lower contact 82, armature 81, lead and contact 134, armature 131, winding 101, lead 100, contact 98, armature 129, leads 128 and 99 to battery 90. Movable unit Figure 9 passes through block C with red light glowing and whistle sounding and enters block B and relays 70 and 78 are energized by 22,000 frequency current from block in advance of block A, and by 25,000 frequency current from block A. The armatures of the relays 70 and 78 are picked up and the circuit of the relay 101 is opened, as the armatures 81 and 231 are withdrawn from their contacts 82 and 83 respectively. The circuit for energizing the solenoid 113 is also opened as the armature 103 leaves its contact 109, and the other circuit for energizing this coil remains open as the relay 94 remains de-energized. The relay 94 cannot be energized until the armature 126 is attracted by the relay 125. The brakes will operate because of the de-energization of the solenoid 113. The visual signal will remain conditioned as in block C. To close valve 113 use push button 107$^C$ its circuit tracing as follows: battery 90, lead 88, armature 71, contact and lead 89, contact 91, armature 79, lead 93, lead and contact 106, push button 107$^C$, winding 101, lead 100, contact 98, armature 129, leads 99 and 128 to battery 90, closing relay 101, closing its armatures, and energizing solenoid and valve 113 as heretofore stated. The advance movable unit in block B now proceeds into block A and movable unit Figure 9 remains in block B will be in same conditions as when it was in block C and will again have to use push button 107$^A$. If the advance movable unit proceeds into block in advance of block A the movable unit Figure 9 will receive caution signal indications as it did in block D, opening the solenoid valve 113 and in order to proceed the engineer will use push button 107$^B$, which energizes solenoid 113 and closes the train line valve, the circuit of which is traced as follows: battery 90, lead 88, armature 72, upper contact and lead 84, lower contact 87, armature 80, leads 92 and 133, push button 107$^B$, coil 100, contact 98, armature 129, leads 128 and 99 to battery 90 holding closed relay 101, and solenoid 113 as stated before.

Figure 10 is a simplified method of accomplishing the function of Figure 8 which is done by eliminating the auxiliary wave wire 137, and high frequency generator 139 has its currents of 27,000 frequency traverse wave wires 3 and 4 in advance and as soon as movable unit enters block B it cuts off the auxiliary wave of 27,000 frequency, otherwise the circuits and apparatus of Figure 9 function and operate the same as explained in connection with Figures 8 and 9.

Figure 11 is a diagrammatic drawing showing one track of a double track railway system in which three different frequencies are employed alternately arranged each frequency radiating throughout the block in which generated, and in the next block in rear. The object is to give a caution signal in second block in rear of occupied block and a danger signal and brake application in first block in rear of occupied block and a second brake application at the entrance of the occupied block. The auxiliary unlock feature described in connection with figures 8, 9 and 10 is obtained by the receiving of the three different frequencies simultaneously at block ends. Figure 11 is the same as Figure 10 and is similarly designated up to and including relay 12 and operates and functions as set out in the description thereof in connection therewith, as regards Figures 8, 9 and 10. Relay 12 has armatures 13 and 39. In describing Figure 11 it will be assumed that relays 12 are energized and their armatures 13 and 39 are in closed position. The generator 139 controlled by relay 12 of block A is adjusted to produce a high frequency current of 27,000 frequency. This current flows from the generator 139 to the armature 39 through the contact 40, lead 35, wave wire 4 thence to the end of block B, radiating its electro-magnetic waves throughout the block B and then by means of the by-pass 144 to the armature 13 of relay 12 controlled by block B, and then through the front contact 21 and lead 35 to the wave wire 3 of block C. The current then flows along the wave wire 3 and radiates its electro-magnetic waves throughout the length of block C. Again starting with relay 12 of block B which controls high frequency generator 140 adjusted to produce 22,000 frequency currents which flows to lead and armature 39 contact 40, lead 35 to wave wire 3 radiating throughout block C, electromagnetic waves to the end thereof, and the current of 22,000 frequency flows through bypass 136 and lead to armature 13 of relay 12 controlled by block C to front contact 21, lead 35 to wave wire 4, and thence throughout the length of block D radiating its electromagnetic waves throughout the length of block D. Again starting with relay 12, controlled by block C, high frequency generator 141 producing 25,000 frequency currents which flows through its connection and armature 39, contact 40, lead 35 to wave wire 4, thence to end of block D, radiating its electromagnetic waves throughout the length of block D and the current of 25,000 frequency then flows through bypass 135 and lead to armature 13 of relay 12 of block D to front contact 21, lead 35 to wave wire 3 of block E thence along wave wire 3 radiating its electromagnetic waves throughout the length of block E. The generators and apparatus of blocks E and F operate the same as do those of blocks A, B, C, and D just described. It will be noted that there are two different frequencies radiating electromagnetic waves throughout each block, for instance from wave wire 4 of block B there is being radiated electromagnetic waves of 25,000 and 27,000 frquencies and in block C from wave wire 3 there is being radiated electromagnetic waves of 22,000 and 27,000 frequencies. It will be noted that relay 12 controlled by block A track circuit has a balancing circuit controlled by its back contact 145 as follows: lead 146, inductance and capacity 135ᴬ, lead 147, to ground. This circuit is to compensate for the cutting off of wave wire 4 in block B, as will be explained in the operation of this part of the invention. Relays of blocks B and C have similar balancing circuits designated 144ᴬ and 136ᴬ.

Figure 12 is a diagrammatic drawing of the apparatus and circuits of a movable unit for use in connection with Figure 11. Its responsive devices 67 are adjusted to frequencies of 22,000; 75 to 25,000 and 123 to 27,000, for westbound traffic. Figures 11 and 12 function as follows: Assume a movable unit to be in block B of Figure 11 and a movable unit equipped as in Figure 12 to be in the center of block F and as the movable unit Figure 12 reaches the entrance of block E the overlapping wave wires 3 and 4 will be radiating electromagnetic waves of 22,000, 25,000 and 27,000 frequencies, consequently relays 70, 78 and 125 will be energized by detectors 67, 75 and 122 picking up their respective armatures and master relay 94, winding 94ᴬ will be energized by its circuit as follows: battery 90, lead 88, armature 71, front contact and lead 89, armature 79, front contact and lead 91, armature 126, front contact and lead 179, winding 94ᴬ, lead 99, battery 90. In parallel with winding 94ᴬ of master relay 94 is block end indicator B through lead 184 to light and lead 185. The energizing of winding 94ᴬ causes armatures 95 and 96 to close their front contact and leads 93 and 97. The green signal light G is in parallel with light B by leads 184' and 185'. The whistle and air brake solenoids 111 and 113 are energized by circuits of armature 96 as follows: battery 90, lead 99, lead 128, lead 204, armature 96, front contact 97, leads 112 and 199, winding 113, lead 200, winding 111, lead 201, lead 118 to battery 90. thus releasing brakes, and green signal light G glows showing clear the movable unit Figure 11 proceeds into block E and electromagnetic waves of 22,000 frequency of wave wire 4 of block F being passed causes relay 70 to become deenergized, dropping its armatures 71, 72, 231, 148, 149 and 150, and therefore winding of 94ᴬ of master relay 94 is deenergized and green signal light G is extinguished also however master relay 94 has its winding 94ᴮ energized and holds its armatures in closed position by circuit traced as follows: from battery 90, lead 88, armature 72, back contact and lead 86, front contact 70, 85, armature 80, lead 177, armature 154, front contact and lead 178, leads 182 and 183 and 195, windings 94ᴮ, lead 198, lead 115, front contact 93, armature 95, lead 126, lead 99 to battery 90, and at the same time green signal light G is given by the energizing of the circuit 114 and 115 being in parallel with winding 94ᴮ of master relay. All other functioning parts and circuits remain as before stated, controlled by relays 78 and 125 which in turn are controlled by detectors 75 receiving 25,000 frequency currents and detector 122 controlled by 27,000 frequency currents and movable unit proceeds under green signal light G of safety through block E to the entrance of block D and enters block D and electromagnetic waves of 27,000 being passed causes relay 125 to become deenergized dropping armatures 126, 154, 155, 156, 157 and 158 and therefore winding 94ᴮ of master relay 94 is deenergized and green signal light G is extinguished also, however master relay winding 94ᶜ is energized and holds its armatures closed by circuit traced as follows: from battery 90, lead 88, armature 149, back contact and lead 162, armature 152, front contact and lead 170 to back contact 174, armature 152, front contact and lead 170 to back contact 174, armature 157, leads 186, 187, 191, 194 and winding 94ᶜ leads 205, 115, front contact 93, armature 95, lead 128 to lead 99, to battery 90, and at the same time the yellow caution signal light Y is given by the energizing of its circuit 92 and 115 and through 205 being in parallel with winding 94ᶜ and its circuit of master relay 94. Relay 78 is energized by detector 75 receiving high frequency current of 25,000 from wave wire 4 of block D and high frequency generator 141. Relay 70 is still deenergized as 22,000 frequency currents from high frequency generator 140 are shut off by relay 12 of block B being held open by reason of movable unit in block B short circuiting its track current, thus movable unit in block D is only receiving wave of 25,000 frequency. Movable unit (Figure 12) proceeds through block D under yellow signal light Y and enters block C; relay 78 is deenergized by reason of movable unit in block B as mentioned before; also, having passed out of the zone of the 25,000 frequency of block D, consequently armatures of relay 78 drop open and deenergizes master relay 94, winding 94ᶜ extinguishing yellow signal light Y, deenergizing solenoids 111 and 113 applying brakes and causing whistle to give audible warning, and displaying red light R which circuit traces as follows: battery 90, lead 99, 128, 204, armature 96 back contact 98, lead 118, through red light R, lead 118, to battery 90. To proceed the movable unit Figure 12 can release the air brake solenoid 113 by the use of push button 107ᴬ closing circuit of relay 101 and its armatures 102, 130, 131, and 103 as follows: battery 90, lead 88, armature 150, back contact and lead 163, armature 153, back contact and lead 175, armature 158, back contact 176, lead 189, push button 107ᴬ, winding 101, lead 100, back contact 98, armature 96, leads 204, 128, 99 to battery thus closing hold relay 101, holding closed through circuit as follows: from back contact 176, lead 190, contact 106, armature 102, lead 203, winding 101, lead 100, back contact 98, armature 96, leads 204, 128, 99 to battery 90. Solenoid of valve 113 and 111 are engaged as follows: from battery 90, leads 99, 128, 204, armature 96 back contact 98, lead 100, contact and lead 109, armature 103, leads 112, 199, 200, 201, 118 to battery 90, thus stopping whistle blowing and releasing brakes. The movable unit Figure 12 can then proceed through block C with red light R indicating danger exists in block B. The movable unit at the entrance of block B while in block C will have its relays 78 and 125 energized by the detectors 75 and 122 tuned to receive frequencies of 25,000 and 27,000 respectively, radiated from wave wire 4 in block B causing relay 101 to be de-energized by reason of breaking contacts 175 and 176 thus opening valves 111 and 113 sounding whistle and applying brakes; in order to release brakes push buttons 107ᴮ can be utilized closing circuit of relay 101 as follows: battery 90, lead 88, armature 72, back contact and lead 86, front contact 85, armature 80, lead 177, armature 154, front contact 178, leads 182, 193, 197, push button 107ᴮ, winding 101, lead 100, back contact 98, armature 96, leads 204, 128, and 99 to battery 90, thus picking up armatures of relay 101, closing its own circuit again through relay 101 as before described likewise energizing solenoid valves 111 and 113 releasing brakes, etc. and movable unit can enter block B where obstruction exists with red light R indicating danger.

To further illustrate the operation of the invention thus depicted in relation to Figures 11 and 12, assume the movable unit in advance in block B to then proceed into block A, causing suspension of radiation of electromagnetic waves of 25,000 and 27,000 frequencies from wave wire 4 in block B. The movable unit Figure 12 remaining in block B will cease to receive the aforesaid 25,000 and 27,000 frequencies and the relays 78 and 125 will become deenergized and all armatures dropping open thus opening circuit through relay 101 functioning as heretofore with respect to valves 111 and 113 and red light R. In order to proceed push button 107ᴬ can be used as previously described.

Assuming the movable unit in block A then proceeds into block in advance of block A and movable unit Figure 12 remains in block B it will then receive frequency of 27,000 from high frequency generator 139 of block B energizing relay 125 and closing its armatures heretofore designated thus opening circuit of relay 101 as before described. In order to proceed it will then be necessary to use push button 107ᶜ again energizing relay 101 as follows: from battery 90, lead 88, armature 129, back contact and lead 162, armature 152, back contact and lead 171, front contact, armature 157, leads 186, 188, push button 107ᶜ, winding 101, lead 100, back contact 98, armature 96, leads 204, 128, 99 to battery 90. This closes relay 101, which will hold closed through its own contact as heretofore described, holding closed valve 111 and 113 with red light R still glowing. Movable unit in advance proceeds into second block in advance of block A and movable unit Figure 12 still located in block B will now proceed to entrance of block A and in the meantime movable unit in advance has passed into third block in advance of block A, movable unit Figure 12 at entrance to block A will then receive electromagnetic waves of 22,000, 25,000 and 27,000 frequencies energizing relays 70, 78 and 125 thus energizing master relay winding 94ᴬ and all other apparatus as described heretofore when movable unit Figure 12 was about to enter block E from block F.

Figure 13 shows application of the invention as applied and described in Figure 11 for use on a single track line of railway in which the track is divided into blocks in the usual manner; blocks A and H being part block sections and B C D E F and G being full blocks. Track circuits, wave wires 3 and 4 and relays 12 are the same as shown in Figure 11 with the exception that track relay 12 has an additional armature 138. The high frequency generators for west bound traffic 139, 140 and 141 are adjusted to produce the same frequencies as in drawing 11 namely 27,000, 25,000 and 22,000. Armature 138 of relay 12 controls auxiliary relay 208 which in turn controls east bound traffic high frequency generators as follows: 211 adjusted to produce 37,500; 212 30,000 frequency and 213 40,000 frequency, such control being accomplished through relay 208's armatures 209 and 210. 228, 229 and 230 are compensating circuits for balancing the cut off wave wires for east bound traffic as was done by compensating circuits for west bound traffic 135ᴬ 136ᴬ and 144ᴬ. 215, 216 and 217 are bypasses for the eastbound traffic waves similar to those numbered 135, 136, and 137 for westbound traffic.

To describe the operation of the apparatus illustrated in Figure 13 and circuits assume movable units as described in Figure 12 to be in block C and F; the one in block F to be adjusted to respond to westbound frequencies of 22,000, 25,000 and 27,000 and the one in block C adjusted to respond to eastbound frequencies of 30,000, 37,500 and 40,000. These frequencies are arranged to be transmitted alternately as set out in Figure 11. The eastbound movable unit in block C short circuits track relay 12 of block C opening its armatures 13, 39 and 138 cutting off high frequency generator 139 of 27,000 frequency from block D and E westbound traffic by opening of armature 13 contact 21 at the same time opening armature 39 contact 40 thus cutting off high frequency currents of 25,000 in block D westbound traffic thus causing block E to be at caution and block D to be at danger as to westbound traffic and at the same time armature 138 contact 52 is opened breaking contact of circuit 224, lead 219 to relay 208 located in block B, thus opening armature 210, contact 226, cutting off high frequency generator 213 producing 40,000 frequency in blocks B and A for eastbound traffic at the same time opening armature 209 contact 225 cutting off high frequency current of 37,500 in block B thus causing block A to be at caution and block B to be at danger with respect to eastbound traffic. The westbound movable unit in block F short circuits track relay 12 of block F opening its armatures 13, 39 and 138 cutting off high frequency generator 139 of 27,000 frequency from block G and H west bound traffic by opening circuit through armature 13 contact 21 at the same time cutting off frequency of 25,000 from block G by opening circuit through armature 39, contact 40, thus causing block H to be at caution and block G to be at danger for west bound traffic. At the same time opening armature 138 contact 52 leads 224 and 219 of relay 208 located in block E thus opening armature 210 contact 226 cutting off high frequency generator 213 producing 40,000 frequency currents in blocks E and D for eastbound traffic and at the same time opening armature 209 contact 225 cutting off high frequency of 37,500 in block E. Therefore the movable unit in block C eastbound has caused block E to be at caution and block D to be at danger with respect to westbound traffic and at the same time has caused block A to be at caution and block B to be at danger with respect to the following movable units eastbound. Likewise a movable unit located in block F westbound has caused block D to be at caution and block E to be at danger with respect to movable units eastbound and at the same time has caused block H to be at caution and block G to be at danger with respect to following movable units westbound.

It will be assumed that movable units in blocks F and C are both receiving their respective frequencies for the traffic in the direction they are moving and their green signal G indications are being displayed with their brake valves 113 and whistle valves 111 being held closed. To describe a further part of the operation of the system relative to Figures 11 and 13, we will now move the west bound train to the entrance of block E allowing the movable unit in block C to remain in same position as heretofore indicated. As the movable unit enters block E from block F it will short circuit track relay 12 of block E causing the same to function as in block F with respect to blocks, C being at caution and D at danger, for east bound traffic, and block G at caution and block F at danger with regard to west bound traffic, at the same time restoring block H to safety by closing the armature 13 contact 21 of relay 12 of block F restoring radiation waves of 27,000 and 22,000 along wave wire 4 in block H. It will be noted that the movable unit in block C will under this condition receive but one frequency that of 37,500 thus causing green signal light G to be extinguished and the yellow signal light Y to glow. Likewise the movable unit westbound as it enters block E had its green signal light G extinguished and its yellow signal light Y glow by reason of movable unit in block C eastbound having cut off radiation of all frequencies except that of 22,000 in block E.

The movable unit west bound proceeds through block E and enters block D short circuiting the track circuit of block D causing block E to be at danger and block F at caution with respect to following westbound traffic and causing block C to be at danger by reason of cutting off the high frequency current on wave wire 3 of block C and therefore causing yellow light Y to be extinguished on movable unit in block C and its red signal light R to glow and at the same time opens valves 111 and 113 causing whistle to sound and brakes to be applied. The valve 113 may be restored by use of push button as heretofore described. The movable unit westbound receives the same danger indications and functions because of the movable unit in block C causing the cessation of waves in block D. By use of push button 107$^A$ the valve 113 may be restored and brakes released on movable unit westbound and proceed through block D. At the entrance of block C the movable unit west bound will receive an application of brakes as heretofore described and by use of push button 107$^B$ may restore brake valve 113 and may proceed through block C with red light signal R still glowing.

Figure 14 is similar to Figure 12 with the exception that the usual block end indicator B is replaced by a more flexible device 243. This may be a light or any form of visual or audible device. The function of said device is to call the engineer's attention that there has been a change in track or wayside conditions, such as passing the end of a block, changing from safety to caution, caution to danger, safety to danger, danger to caution, caution to safety or from danger to safety.

In the lead 183—195 is inserted the primary of a transformer 232, having a high inductance but low resistance. Likewise in lead 191—194 is inserted the primary of a similar transformer 234. The secondaries 233 and 235 of these transformers are connected so that an increase of current through one primary accompanied by a decrease of current through the other will result in a maximum induced current in the secondaries. The secondaries thus connected are connected to relay magnet 239, which when energized, causes its armature 240 to close a local circuit through the indicating device 243 and battery 242, by means of contact 241 and leads 244 and 245.

The operation is as follows: As the number of received frequencies changes, the master relay 94 is energized through different windings as heretofore explained. As the path of the current changes from one circuit to another, there will be a momentary increase or decrease in current through the transformer primaries. This will cause a momentary current to be induced in the secondaries which will momentarily energize and close relay 239.

Other forms and types of high frequency generators may be used in the place of the vacuum tube herein set out without in any way departing from the scope and intent of the invention. Furthermore it is not desired to limit the values of the frequencies used or to the form or construction of by-passes, or any other apparatus or parts, set out heretofore herein or described in connection therewith.

While the invention has been described and shown in the drawings as being used upon single and double track railway it should be understood that it is the intent and purpose that the same may be used upon a plurality of tracks of railways both electric, steam or otherwise, without in any way departing from the scope and intent of the invention.

Having thus described our invention, what we claim is:

1. In a train control system of the class described, a track divided into blocks, a wave wire for each block, means for impressing radio frequent oscillatory current of one frequency upon the wave wires of alternate blocks, means for impressing radio frequent oscillatory current of a different frequency upon the wave wires of the other blocks, and means associated with adjacent blocks responsive to the beat frequency of said currents.

2. In a train control system of the class described, a track divided into blocks, a wave wire for each block, means for impressing radio frequent oscillatory current upon said wave wires, the frequency of the current impressed on the wave wire of one block being different from that impressed upon the wave wire of the adjacent block, and means associated with adjacent blocks responsive to the beat frequency of said currents.

3. In a train control system of the class described, a track divided into blocks, a wave wire for each block, means for impressing upon each wave wire a plurality of radio frequent oscillatory currents of differing frequencies, the frequencies of the currents impressed upon the wave wire of one block being different from that impressed upon the wave wire of the adjacent block, and means associated with a movable element on said track responsive to the beat frequency of the currents of adjacent blocks.

4. In a train control system of the class described, a double track railway divided into blocks, a wave wire for each block, said wave wire being common to both tracks in the block, and means for impressing radio frequent oscillatory current of one frequency upon the wave wires of alternate blocks and means for impressing radio frequent oscillatory current of different frequency upon the wave wires of the other blocks.

5. In a train control system of the class described a double track railway divided into blocks, a wave wire for each block, said wave wire being common to both tracks in the block, and means for impressing upon each wave wire, a plurality of radio frequent oscillatory currents of different frequencies, the frequencies of the currents impressed upon the wave wire of one block being different from those impressed upon the wave wire of the adjacent block.

6. In a train control system of the class described, an antenna to radio frequent oscillation detectors, said detectors tuned to different frequencies, means operatively connecting said detectors with said antenna, a train control circuit, and means whereby said detectors operating at the same time or either detector operating singly may maintain normal conditions in the circuit.

7. In a train control system of the class described, two radio frequent oscillation detectors tuned to different frequencies and an antenna, the antenna being operatively connected to the detectors, a train control circuit, and means for maintaining normal conditions in said circuit by the alternate operation of one of said detectors and both of said detectors.

8. In a train control system of the class described, an antenna, two radio frequent oscillation detectors tuned to different oscillation frequencies, said detectors being operatively connected with the antenna, a train control circuit, and means whereby said detectors operating at the same time or singly may maintain said circuit in normal condition.

9. In a train control circuit of the class described, an antenna, two radio frequent oscillation detectors tuned to different frequencies, said detectors being operatively connected with the antenna, a train control circuit and means for establishing normal conditions in the circuit by the joint or separate operation of the detectors.

10. A system of wireless train control comprising a track divided into blocks, a wave wire assigned to each block, means for impressing current of a definite high frequency upon the wave wires of alternate blocks, and a movable unit provided with means responsive to wireless waves propagated by the wave wires, arranged to give "block end" indications when the responsive means is simultaneously detecting waves from the adjacent ends of wave wires of contiguous blocks.

11. A system of wireless train control comprising a track divided into blocks, a wave wire assigned to each block, means for impressing current of a definite high frequency upon the wave wires of alternate blocks, and a movable unit provided with means responsive to the "beat frequency" produced by the wireless waves propagated by the wave wires, arranged to give "block end" indications when the responsive means is simultaneously detecting waves from adjacent ends of wave wires of contiguous blocks.

12. A system of wireless train control comprising a track divided into blocks, a wave wire assigned to each block, means for impressing high frequency currents of different frequencies upon the wave wires of alternate blocks, means associated with one block responsive to wireless waves from the wave wires, and means whereby said waves are influenced by the occupied position of a block two blocks in the rear and two blocks in advance.

13. A system of wireless train control comprising a track divided into blocks, a wave wire assigned to each block, means for impressing high frequency currents of different frequencies upon the wave wires of alternate blocks, respectively, a movable unit provided with means responsive to the wireless waves propagated by the wave wires, and means whereby said waves are influenced by the occupied position of a block two blocks in the rear and two blocks in advance.

In witness whereof, we hereunto subscribe our names this 19th day of February, 1920.

JOHN A. MILLER.
GILBERT W. CATTELL.